United States Patent
Ito et al.

(10) Patent No.: US 7,159,924 B2
(45) Date of Patent: Jan. 9, 2007

(54) VISIBILITY ADJUSTING METHOD AND APPARATUS OF VEHICLE

(75) Inventors: Mitsuhito Ito, Fujisawa (JP); Kenya Uenuma, Yokohama (JP); Keijiro Iwao, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/916,594

(22) Filed: Aug. 12, 2004

(65) Prior Publication Data

US 2005/0046222 A1    Mar. 3, 2005

(30) Foreign Application Priority Data

Sep. 1, 2003    (JP) .............................. 2003-309273
Sep. 12, 2003   (JP) .............................. 2003-321597

(51) Int. Cl.
    *B60J 1/00*     (2006.01)
    *B60J 3/00*     (2006.01)
(52) U.S. Cl. .................... 296/96.19; 296/97.7
(58) Field of Classification Search ............. 296/96.19, 296/97.7
    See application file for complete search history.

(56) References Cited

U.S. PATENT DOCUMENTS 2,187,027 A * 1/1940 O'Dell .................... 296/97.7
2,253,766 A * 8/1941 Crowell .................... 296/97.7
2,289,144 A * 7/1942 Rossell et al. ........... 296/96.19
3,276,813 A * 10/1966 Shaw, Jr. ................ 296/96.19
4,555,434 A * 11/1985 Kunert ........................ 428/194
5,040,838 A * 8/1991 Yoshizawa ................. 296/84.1

FOREIGN PATENT DOCUMENTS

JP    2000-211355    8/2000

* cited by examiner

*Primary Examiner*—Dennis H. Pedder
(74) *Attorney, Agent, or Firm*—McDermott Will & Emery LLP

(57) ABSTRACT

A visibility adjusting section (10) is formed by making a visible light transmission of a region (A) in a lower side of left and right ridgelines (Rl, Rr) lower than a visible light transmission of a region (B) in an upper side of the left and right ridgelines (Rl, Rr). Accordingly, a driver and a passenger on an assistant driver's seat can see an outer side of a vehicle through the visibility adjusting section (10), and a suitable light can be taken into the vehicle. Further, since a parting line (11) of the visibility adjusting section (10) is uniformly inclined downward toward opposite sides in a vehicle-width direction from an apex (T) disposed at a position which is deviated from a driver, a driving posture of the driver is stabilized, and it is possible to suppress a disturbance in a steering operation.

8 Claims, 26 Drawing Sheets

VERTICAL AXIS

HORIZONTAL AXIS

HEAD VERTICAL AXIS

HEAD HORIZONTAL AXIS

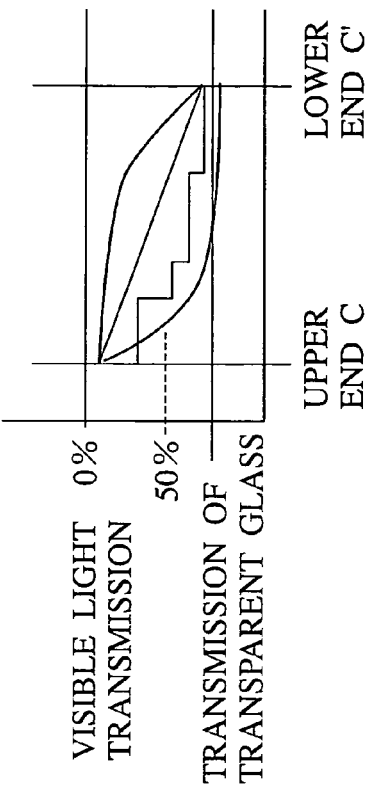
FIG.15A
FIG.15B
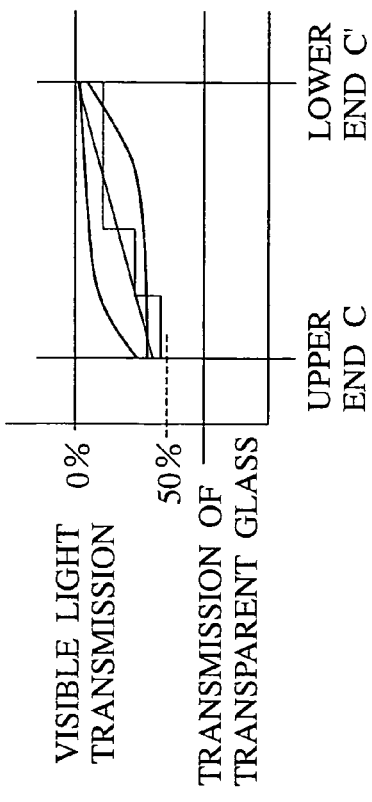
FIG.16A
FIG.16B

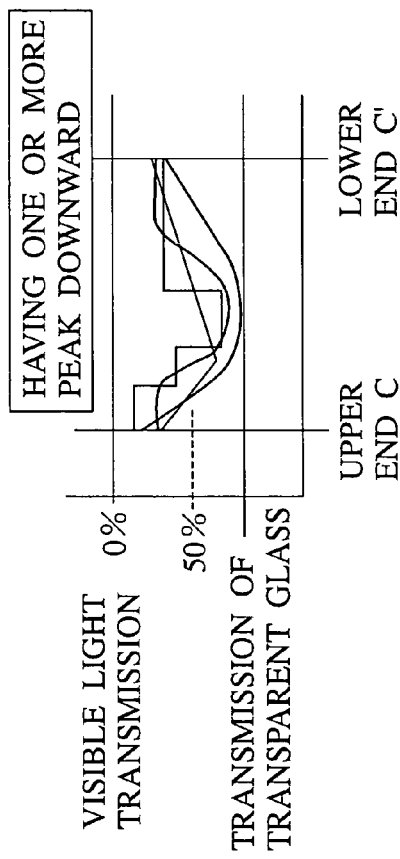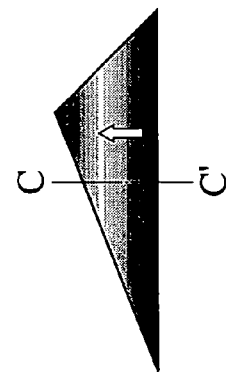
FIG.17A
FIG.17B
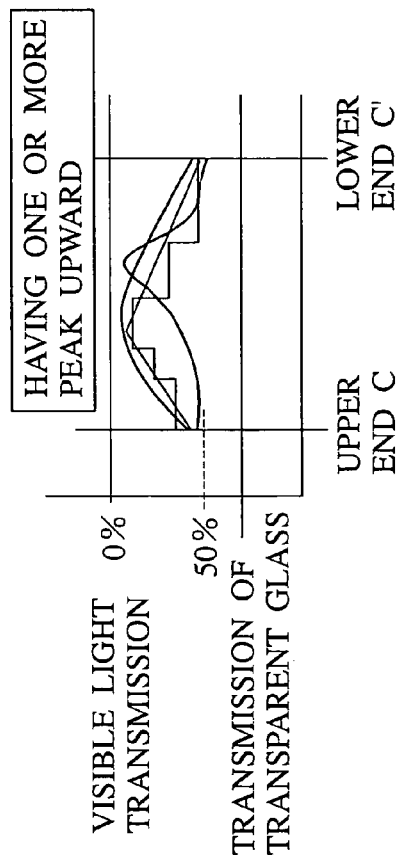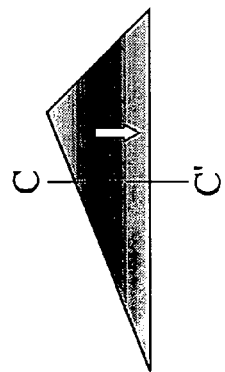
FIG.18A
FIG.18B

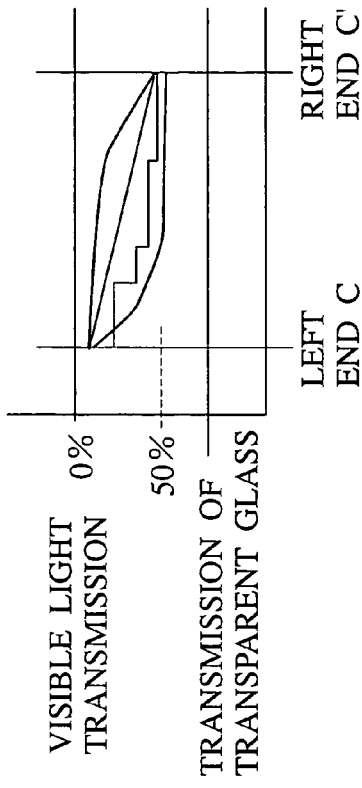
FIG.19A
FIG.19B
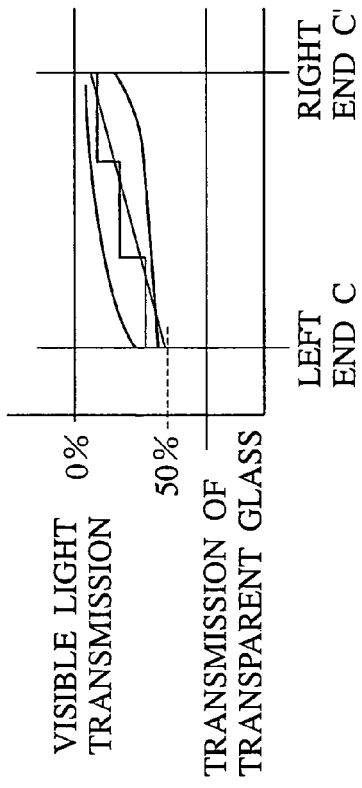
FIG.20A
FIG.20B

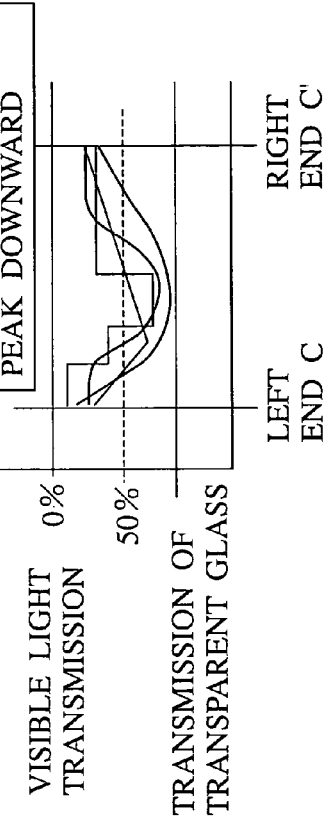
FIG.21A
FIG.21B
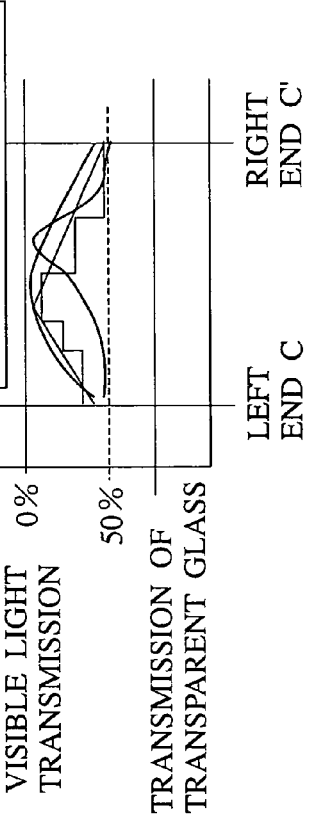
FIG.22A
FIG.22B

VISIBILITY ADJUSTING METHOD AND APPARATUS OF VEHICLE

BACKGROUND OF THE INVENTION

The present invention relates to a visibility adjusting method and an apparatus for adjusting a driver's forward visibility by providing a lower end of a windshield with a visibility adjusting section, and more particularly to a technique for achieving an improvement of a visibility near the vehicle at an extremely low speed range, an increase of an amount of lighting within a vehicle and an enlargement of a visible range by a passenger on an assistant driver's seat.

Conventionally, there is known a visibility adjusting method of a vehicle in which a lower end of a windshield is shielded, and the forward visibility of a driver is adjusted, thereby enhancing the safety as disclosed in Japanese Patent Application Laid-Open No. 2000-211355 for example.

In such a conventional visibility adjusting method of a vehicle, however, since it is made such that a forward visibility by the driver is adjusted by shielding a lower end of the windshield, the visibility near the vehicle is blocked at the time when the vehicle runs at an extremely low speed range such as the time of backing the vehicle in to a garage, the time of passing closely-by and the like, whereby there is a case that the driver feels insecure.

Further, in the conventional visibility adjusting method of a vehicle, since it is made such that the forward visibility by the driver is adjusted by shielding the lower end of the windshield, an amount of lightening within the vehicle is reduced, and the visibility of the passenger on the assistant driver's seat is blocked, whereby there is a case that the passenger on the assistant driver's seat is annoyed.

The present invention has been accomplished to solve the problems mentioned above, and an object of the present invention is to provide a visibility adjusting method and an apparatus of a vehicle which can improve a visibility near a vehicle in an extremely low speed range, increase an amount of lightening and enlarge a visible range of a passenger on an assistant driver's seat.

Further, another object of the present invention is to provide a visibility adjusting method and an apparatus of a vehicle which can uniformize an angle of a parting line of a visibility adjusting section while securing a sufficient forward visibility even during medium and low speed running such as the time of running on an urban area or the like, by limiting an area of the visibility adjusting section to be small.

SUMMARY OF THE INVENTION

In order to achieve the object mentioned above, a first aspect of the present invention provides a visibility adjusting method of a vehicle which makes a visible light transmission of a visibility adjusting section formed in a lower end of a windshield lower than a visible light transmission of the windshield. Further, the first aspect of the present invention provides a visibility adjusting apparatus of a vehicle which makes a visible light transmission of a visibility adjusting section formed in a lower end of a windshield lower than a visible light transmission of the windshield.

According to the visibility adjusting method and apparatus according to the first aspect, since the visibility adjusting section has the lower visible light transmission than the windshield and does not completely shield the light entering into the vehicle, the driver and the passenger on the assistant driver's seat can see an outer side of the vehicle through the visibility adjusting section, and can take a suitable light into the vehicle. In other words, it is possible to improve a visibility near the vehicle at an extremely low speed range, increase an amount of lighting, and enlarge a visible range of the passenger on the assistant driver's seat.

Further, in order to solve the above problems, a second aspect of the present invention provides a visibility adjusting method of a vehicle, such that the visibility adjusting section disposes an apex at a position which is between an opposing position to the driver and a vehicle center position and is deviated from the driver, sets right and left ridgelines which are downward inclined from the apex toward opposite sides in a vehicle-width direction, forms a parting line for adjusting a visibility of a lower end in the windshield by the apex and the right and left ridgelines, and separates at least one of the right and left ridgelines into two or more ridgelines which are approximately parallel to each other and are arranged in different levels. Further, the second aspect of the present invention provides a visibility adjusting apparatus of a vehicle, such that the visibility adjusting section disposes an apex at a position which is between an opposing position to the driver and a vehicle center position and is deviated from the driver, sets right and left ridgelines which are downward inclined from the apex toward opposite sides in a vehicle-width direction, forms a parting line for adjusting a visibility of a lower end in the windshield by the apex and the right and left ridgelines, and separates at least one of the right and left ridgelines into two or more ridgelines which are approximately parallel to each other and are arranged in different levels.

According to the visibility adjusting method and apparatus of the vehicle according to the second aspect, since the parting line which blocks the forward visibility and is inclined to the right and left sides is applied to the lower end of the windshield, it is possible to suppress a sway of a head inclination angle by stabilizing a balance sense of the driver, and it is possible to suppress a steering disturbance based on a stability of a driving posture. Further, according to the visibility adjusting method and apparatus of the vehicle according to the present invention, since at least one of the right and left ridgelines is separated into two or more ridgelines which are approximately parallel to each other and are arranged in different levels, it is possible to uniformize the angle of the ridgeline forming the parting line applied to the driver while limiting the area of the visibility adjusting section to be small, and thus it is possible to achieve both of an effect of stabilizing the driving posture and an effect of securing the visibility during medium and low speed running.

BRIEF DESCRIPTION OF THE DRAWINGS

FIGS. 15A and 15B show a configuration of the visibility adjusting section in the case that the visible light transmission becomes higher from an upper end toward a lower end, in the second embodiment of the invention;

FIGS. 16A and 16B show a configuration of the visibility adjusting section in the case that the visible light transmission becomes lower from an upper end toward a lower end, in the second embodiment of the invention;

FIGS. 17A and 17B show a configuration of the visibility adjusting section in the case that the visible light transmission has a distribution state having a downward peak (a minimum value) in up and down directions, in the second embodiment of the invention;

FIGS. 18A and 18B show a configuration of the visibility adjusting section in the case that the visible light transmission has a distribution state having an upward peak (a maximum value) in the up and down directions, in the second embodiment of the invention;

FIGS. 19A and 19B show a configuration of the visibility adjusting section in the case that the visible light transmission becomes higher from a left end toward a right end, in the second embodiment of the invention;

FIGS. 20A and 20B show a configuration of the visibility adjusting section in the case that the visible light transmission becomes lower from the left end toward the right end, in the second embodiment of the invention;

FIGS. 21A and 21B show a configuration of the visibility adjusting section in the case that the visible light transmission has a distribution state having a downward peak (a minimum value) in right and left directions, in the second embodiment of the invention;

FIGS. 22A and 22B show a configuration of the visibility adjusting section in the case that the visible light transmission has a distribution state having an upward peak (a maximum value) in the right and left directions, in the second embodiment of the invention;

DETAILED DESCRIPTION OF THE PREFERRED EMBODIMENTS

A visibility adjusting method of a vehicle according to embodiments of the present invention will be explained in detail with reference to the drawings.

First Embodiment

A visibility adjusting method according to a first embodiment of the invention will be explained first.

Figure 1:
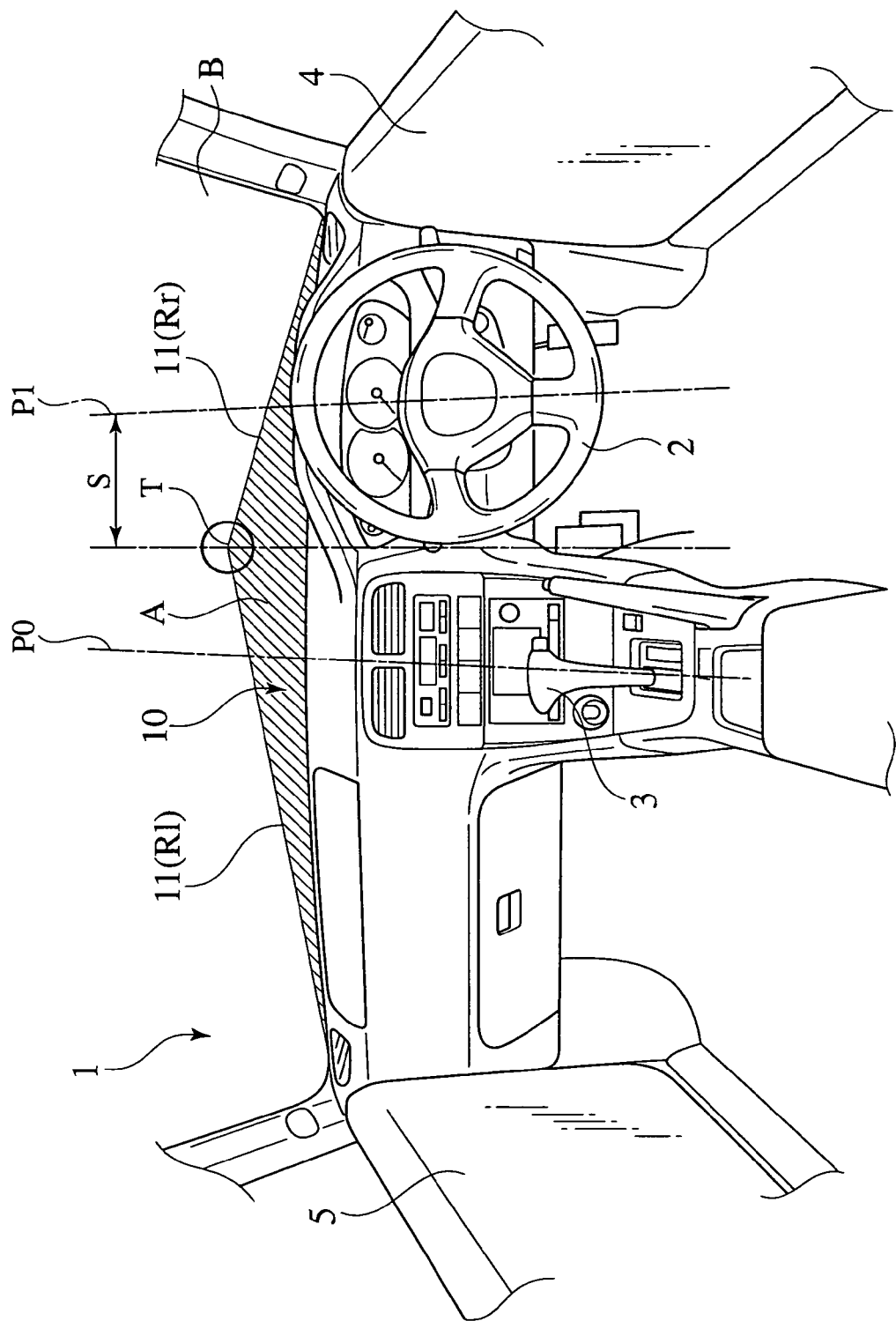
FIG. 1 is an explanatory view of a visibility adjusting method of a vehicle according to a first embodiment of the invention.

A visibility adjusting method according to a first embodiment is, as shown in FIG. 1, such that a visibility adjusting section 10 is provided in a lower end of a windshield 1 and a forward visibility by a driver is adjusted by the visibility adjusting section 10. Further, the visibility adjusting section 10 is formed by (1) disposing an apex T at a position which is between an opposing position P1 to the driver and a vehicle center position P0 and is deviated from the opposing position P1 to the driver at a distance S, (2) setting left and right ridgelines Rl and Rr which are uniformly inclined from the apex T toward opposite sides in a vehicle-width direction, (3) making a visible light transmission of an area A which is in a lower side of the left and right ridgelines Rl and Rr lower than a visible light transmission in an area B which is in an upper side thereof and forming a parting line 11 corresponding to the left and right ridgelines Rl and Rr based on a contrast difference between the area A and the area B. In this case, in FIG. 1, reference numerals 2, 3, 4 and 5 respectively denote a steering wheel, a control lever, a right front door and a left front door.

Figure 2:
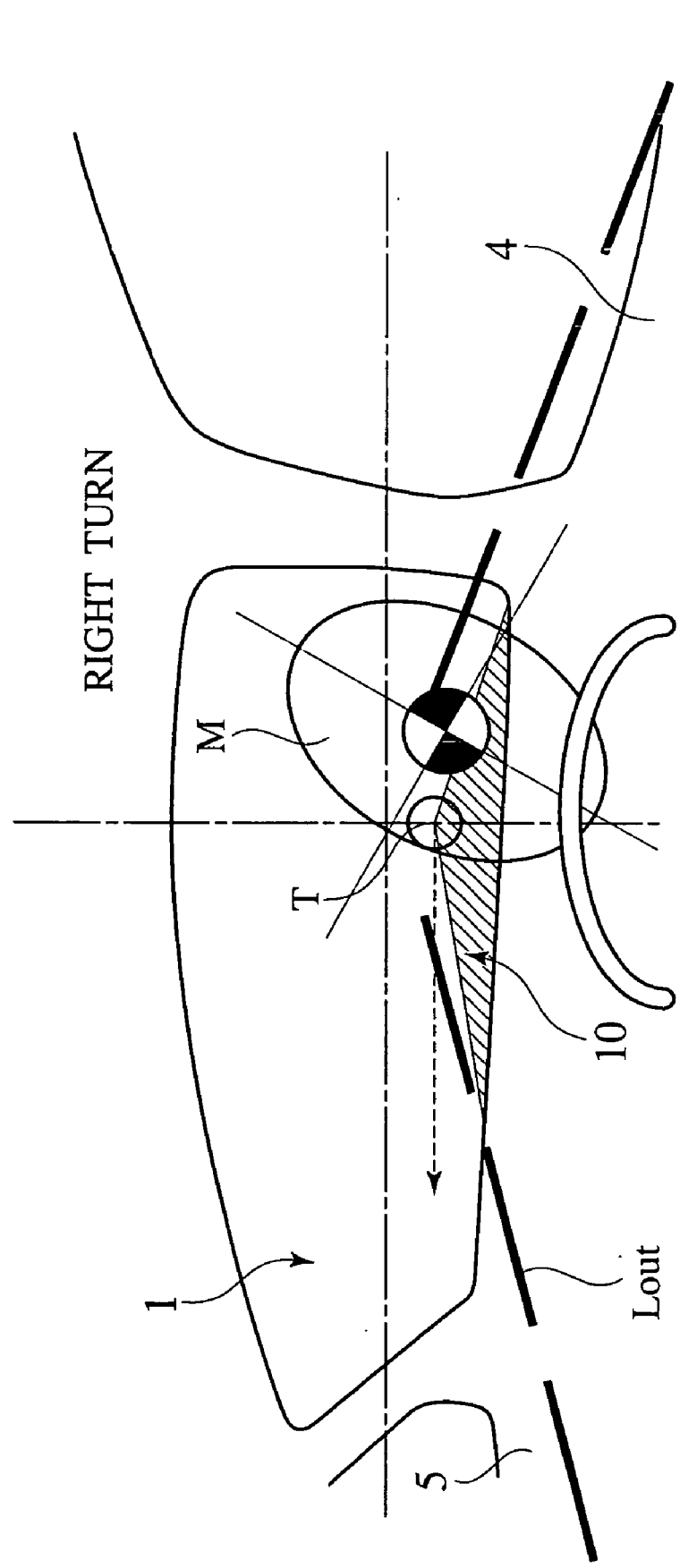
FIG. 2 is an explanatory view of a relation between a parting line and a forward visibility as viewed from a driver, in the first embodiment of the invention.
Figure 3:
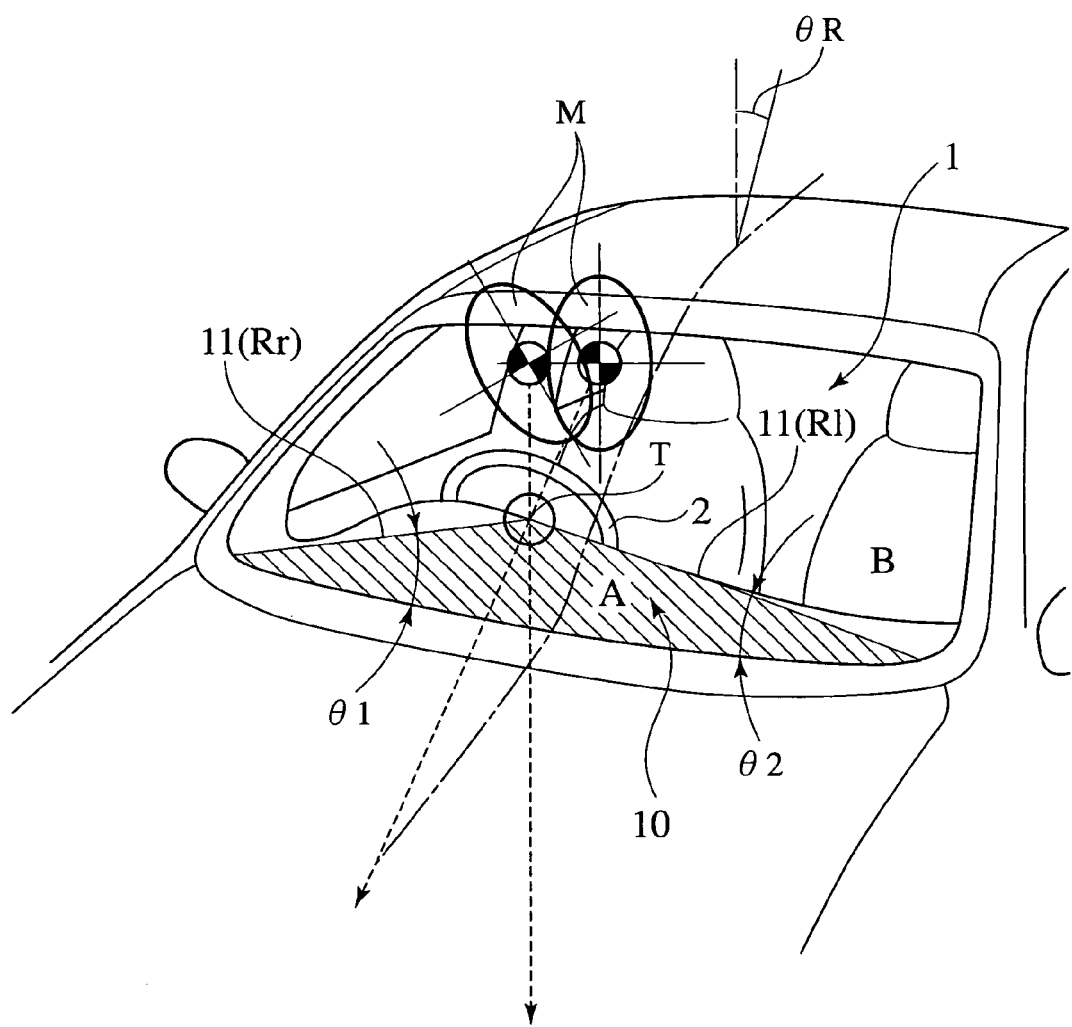
FIG. 3 is an explanatory view of a relation between a line of vision of the driver and an apex of the parting line, in the first embodiment of the invention.

Further, as shown in FIG. 2, the apex T is located such that a line of vision which connects the apex T and a visual point of a driver M at the time of turning posture is on an outer side of a turning outer side lane Lout when a right-hand vehicle turns to the right (turns to the left if the vehicle is a left-hand vehicle). Further, as shown in FIG. 3, when a maximum angle of inclination formed between a horizontal line and a ridgeline on the side of the driver M, that is, the right ridgeline Rr in the case of the right-hand vehicle and the left ridgeline Rl in the case of the left-hand vehicle is defined as θ1 and θ2, magnitudes of the angles θ1 and θ2 are set greater than a roll angle $\theta_R$ of the vehicle.

Figure 4:
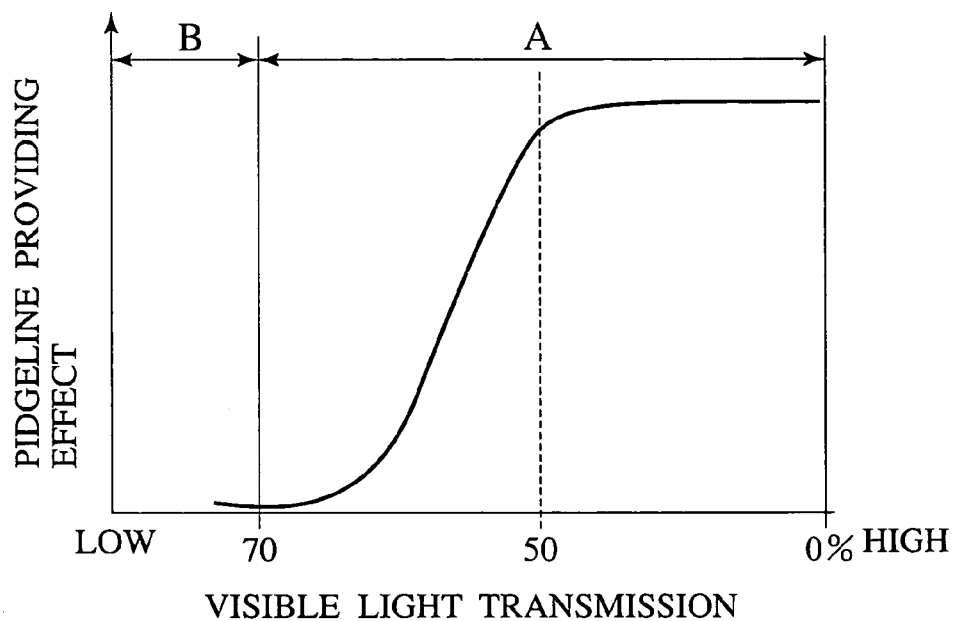
FIG. 4 shows a visible light transmission of a visibility adjusting section, in the first embodiment of the invention.

Further, the visible light transmission of the area A is set, as shown in FIG. 4, such as to be equal to or less than 50% of the visible light transmission of the area B. In general, the visible light transmission of a transparent glass used for the windshield 1 is about 70 to 80%. Accordingly, the parting line 11 can be formed based on the contrast difference between the area A and the area B by setting the visible light transmission of the area A equal to or less than 50% of the visible light transmission of the area B. Further, if the visible light transmission of the area A is equal to or less than about 50%, a visibility is not completely blocked as is different from a privacy glass used for a rear window glass. Accordingly, the driver and the passenger on the assistant driver's seat can see an outer side of the vehicle via the visibility adjusting section 10.

Figure 5:
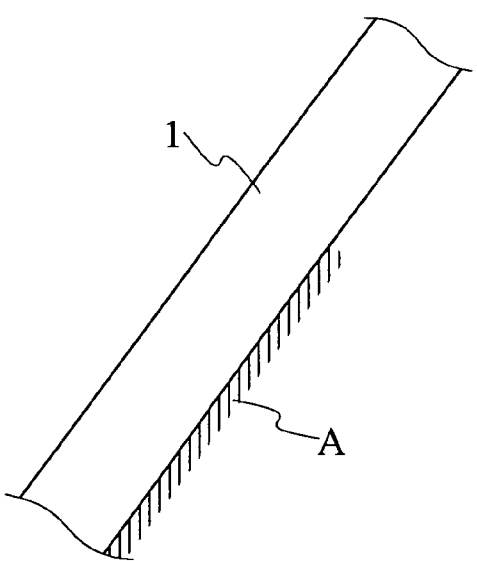
FIG. 5 is an explanatory view of a method of forming the visibility adjusting section, in the first embodiment of the invention.

In this case, the visible light transmission of the area A can be adjusted by coloring the windshield 1 or attaching a pattern such as dot, a mesh to the windshield 1. More specifically, the visible light transmission of the area A can be adjusted by coating a front surface or a back surface of the windshield 1 or sandwiching a film in an inner portion of the windshield 1. Further, as shown in FIG. 5, the visible light transmission of the area A may be adjusted by attaching a film or a plate to the back surface of the windshield 1 from an inner side of the vehicle. Further, the visible light transmission of the area A may be adjusted by utilizing a half mirror which does not transmit the light from the outer side of the vehicle. Further, the visible light transmission of the area A may be adjusted by utilizing a light control glass in which the transmission is changed in correspondence to an intensity of an ultraviolet light.

As is apparent from the description mentioned above, in the visibility adjusting method according to the first embodiment, the parting line 11 of the visibility adjusting section 10 provided in the lower end of the windshield 1 is uniformly downward inclined toward both sides in the vehicle-width direction from the apex T disposed at the position which is deviated from the driver.

Figure 6A:
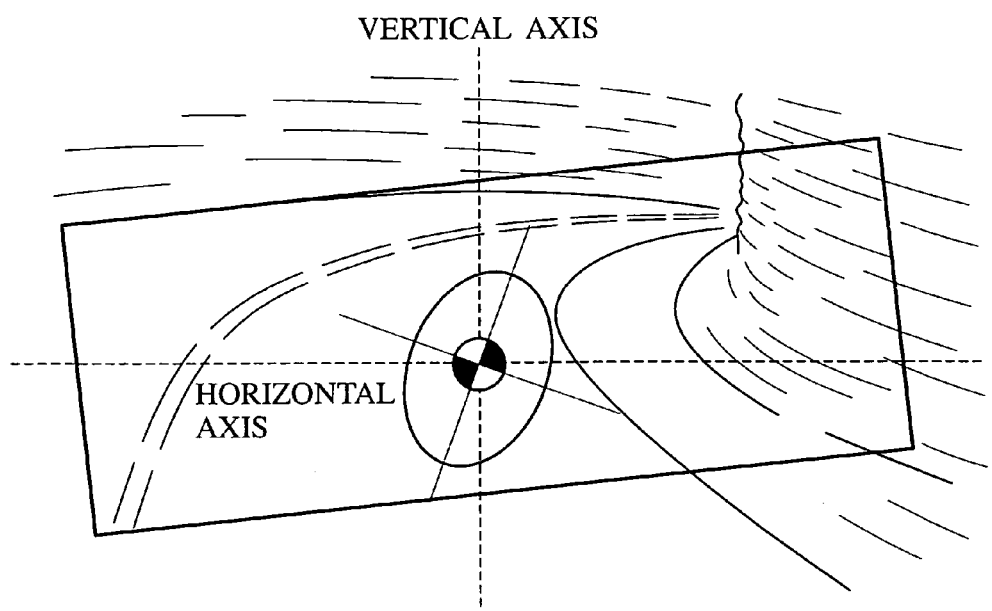
FIGS. 6A and 6B are explanatory views of a conventional visibility adjusting method of a vehicle.
Figure 6B:
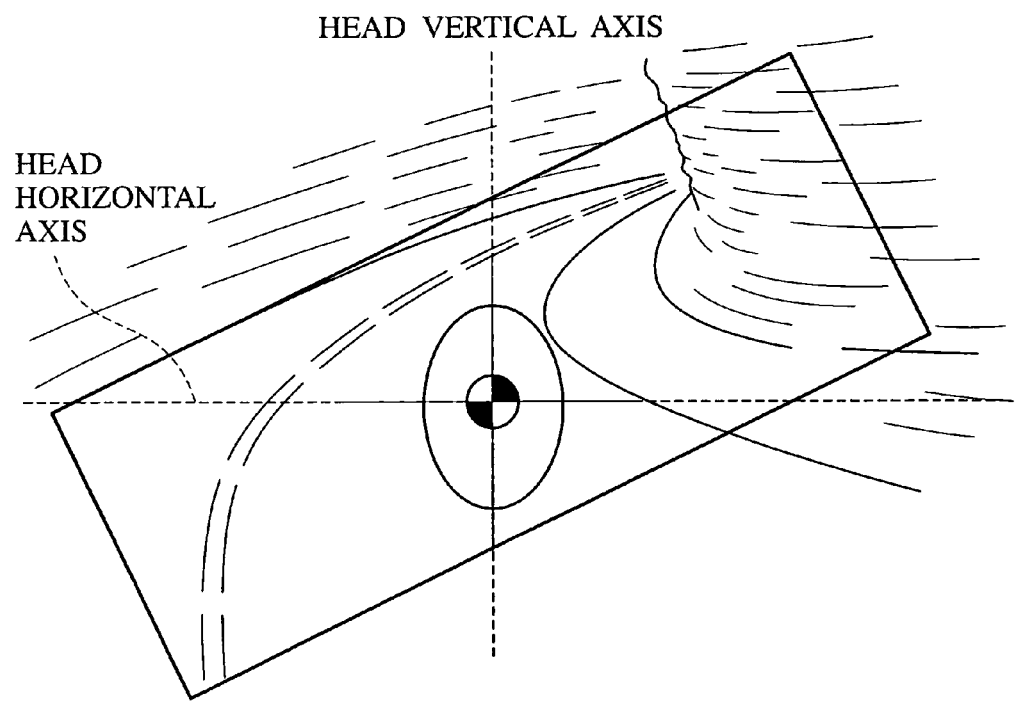

In the conventional visibility adjusting method of a vehicle, since the parting line in the upper end edge shielding the lower end of the windshield extends in a straight line in the vehicle-width direction, when coordinates are set on vertical and horizontal axes relative to gravity of the earth as shown in FIG. 6A, the vehicle rolls to a left side and the head inclines to a right side against a turning lateral acceleration at the time of turning to the right along the curved road. Viewing the scenery relative to the head coordinates at this time, the forward visibility rolls at the rolling angle of the vehicle or more, as shown in FIG. 6B.

At this time, the driver adjusts the head inclination angle such that a vector sum of a gravitational acceleration and the turning lateral acceleration has a direction near the head vertical axis, however, it is confirmed that the position is not always stabilized and varies. Further, as a result of the variation, the driving posture becomes unstable, the steering operation is disturbed according thereto, and the disturbance of the steering operation promotes the fluctuation of the turning lateral acceleration and causes a vicious circle that the head inclination angle becomes further unstable.

Figure 7:
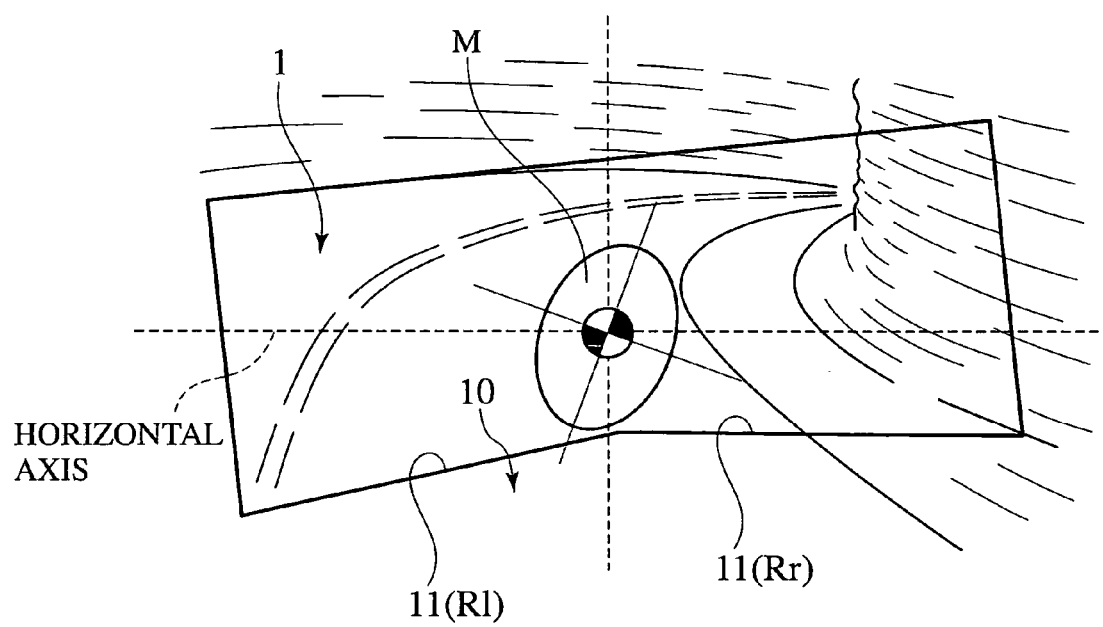
FIG. 7 is an explanatory view of a forward visibility at the time of making a right turn, in the first embodiment of the invention.
Figure 8:
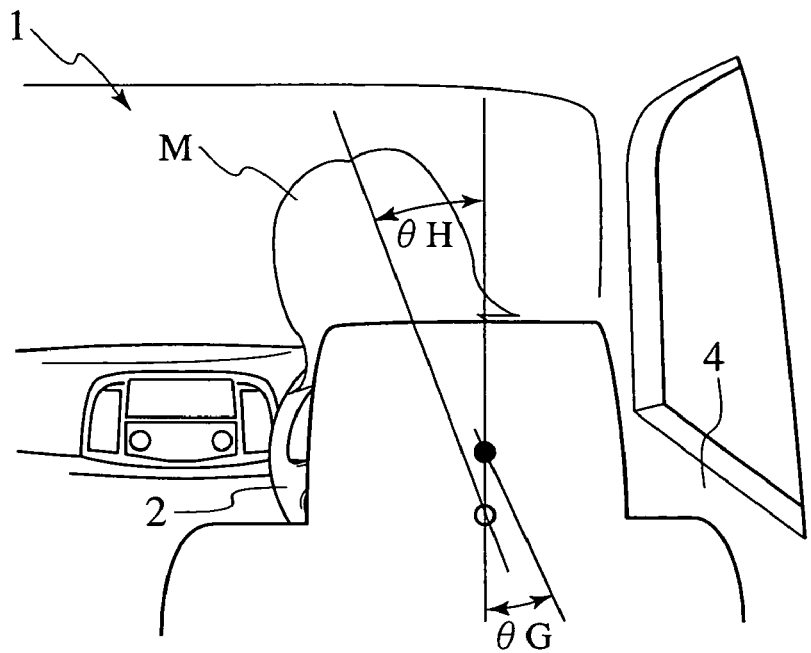
FIG. 8 is an explanatory view of a relation between a head angle and a pendulum angle at the time when the vehicle turns, in the first embodiment of the invention.

On the contrary, in the visibility adjusting method of a vehicle according to the first embodiment, since the parting line 11 is uniformly downward inclined toward both sides in the vehicle-width direction from the apex T disposed at the position which is deviated from the driver, as mentioned above, it is possible to suppress the inclination of the forward visibility by the inclined parting line 11 as shown in FIG. 7, and thus it is possible to suppress the fluctuation of the head inclination angle $\theta_H$ (refer to FIG. 8) at the time of turning, whereby the driving posture is stabilized and it is possible to suppress the disturbance of the steering operation.

Figure 9:
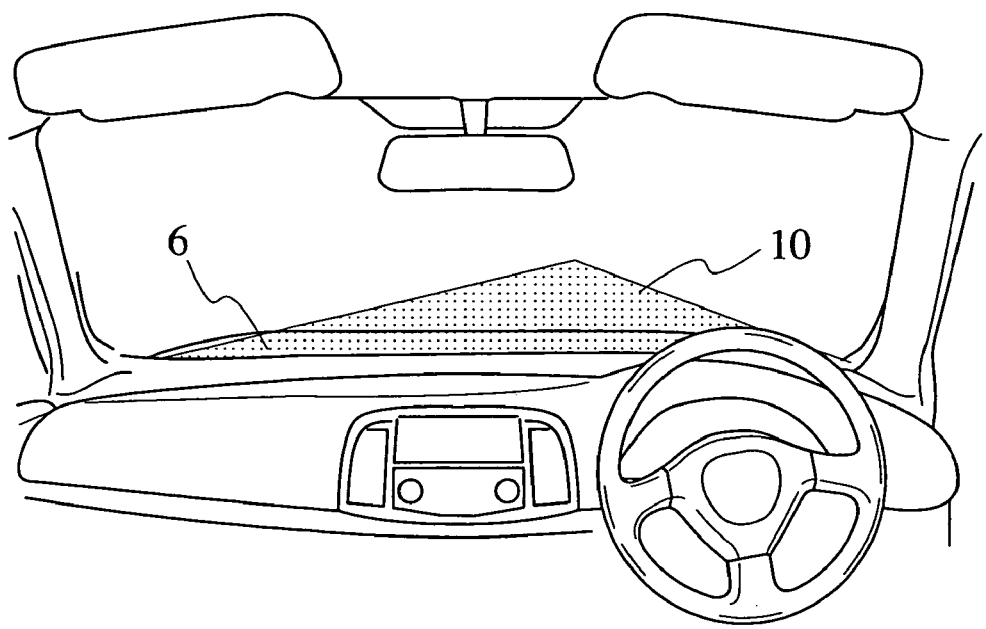
FIG. 9 shows the visibility adjusting section according to the first embodiment of the invention, in a vehicle in which an engine hood forms a parting line.

Further, according to the visibility adjusting method of the first embodiment, since the visibility adjusting section 10 is formed by making the visible light transmission of the area A in the lower side of the left and right ridgelines Rl and Rr lower than the visible light transmission of the area B in the upper side of the left and right ridgelines Rl and Rr, the driver and the passenger on the assistant driver's seat can see the outer side of the vehicle through the visibility adjusting section 10, and it is possible to take a suitable light into the vehicle. Further, even in a vehicle in which the engine hood 6 forms the parting line as shown in FIG. 9, the driver and the passenger on the assistant driver's seat can view the vehicle body via the visibility adjusting section 10. Further, it is possible to suppress the contrast of texture on the road surface and it is possible to prevent the driver and the passenger on the assistant driver's seat from feeling fatigue due to excessively excellent visibility of the portion near the vehicle body. Further, when the driver does not pay attention to the visibility adjusting section 10 at the time of turning, it is possible to impart the same impression as that of the case that the visibility adjusting section 10 is completely shielded to the driver. Accordingly, it is possible to apply the effect obtained by the parting line 11 as mentioned above to the driver.

Further, according to the visibility adjusting method of the first embodiment, since the parting line 11 is formed by the contrast difference between the area A and the area B, it is possible to change a design property of the vehicle in comparison with the case that only the parting line 11 is provided without changing the visible light transmission.

Further, according to the visibility adjusting method of the first embodiment, since the visible light transmission of the area A is adjusted by utilizing the half mirror which does not transmit the light from the outer side of the vehicle, it is possible to improve the design property of the vehicle.

Further, according to the visibility adjusting method of the first embodiment, since the visible light transmission of the area A is adjusted by utilizing the light control glass in which the transmission is changed in correspondence to the intensity of the ultraviolet light, it is possible to uniformly change the visible light transmission in correspondence to increase or decrease in an amount of the ultraviolet light, and it is possible to keep constant the contrast difference between the area A and the area B.

Second Embodiment

Next, a visibility adjusting method according to a second embodiment of the invention will be explained.

Figure 10:
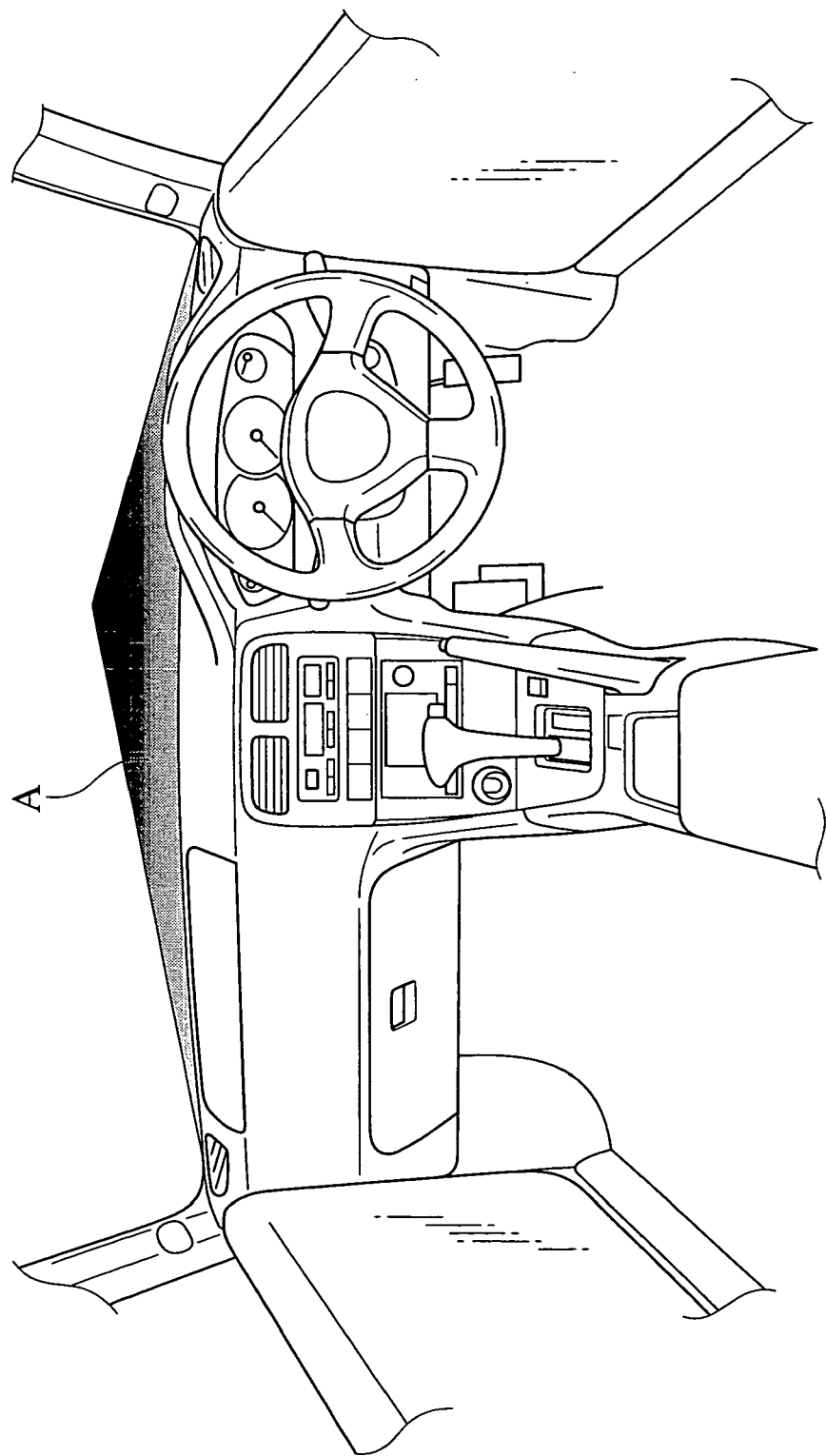
FIG. 10 is an explanatory view of a visibility adjusting method of a vehicle according to a second embodiment of the invention.
Figure 11A:
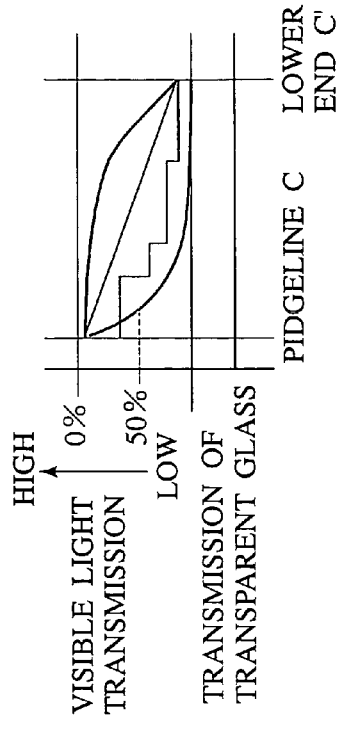
FIGS. 11A and 11B show a configuration of the visibility adjusting section in the case that a visible light transmission becomes higher according to being back away from the right and left ridgelines, in the second embodiment of the invention.
Figure 11B:
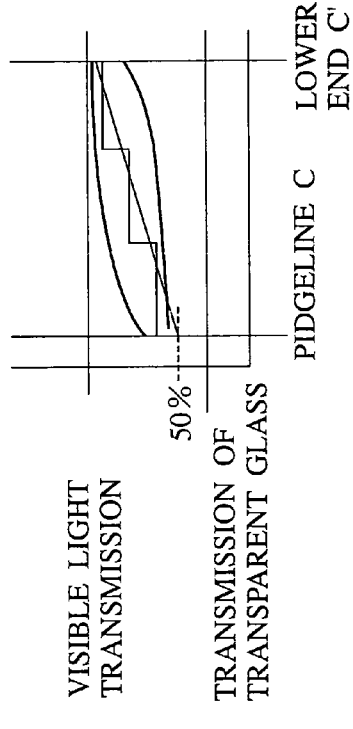
Figure 12A:
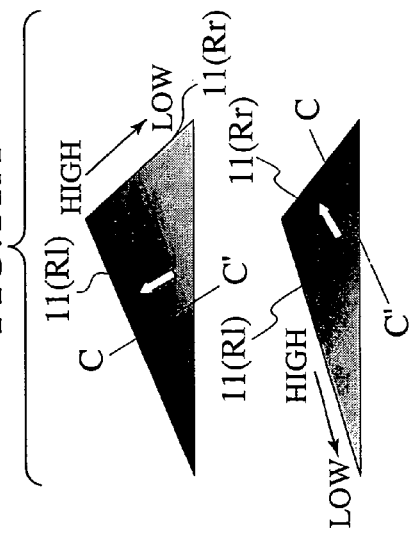
FIGS. 12A and 12B show a configuration of the visibility adjusting section in the case that a visible light transmission becomes lower according to being back away from the right and left ridgelines, in the second embodiment of the invention.
Figure 12B:
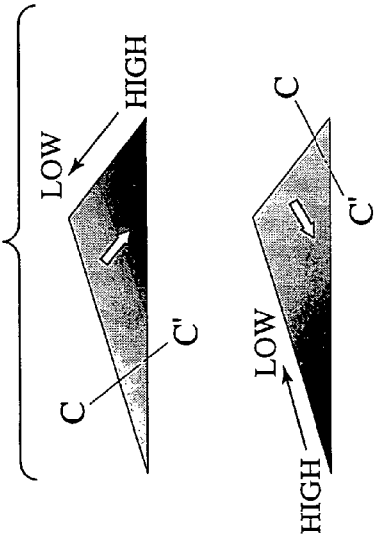
Figure 13A:
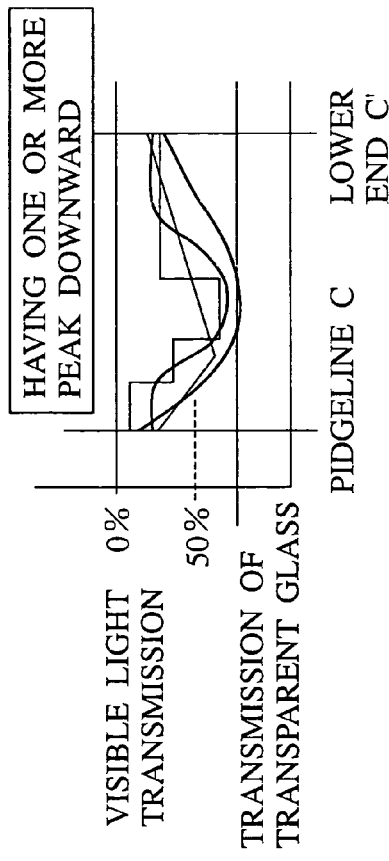
FIGS. 13A and 13B show a configuration of the visibility adjusting section in the case that the visible light transmission has a distribution state having a downward peak (a minimum value) along a vertical direction to the right and left ridgelines, in the second embodiment of the invention.
Figure 13B:
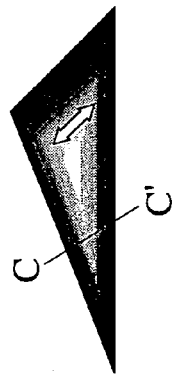
Figure 14A:
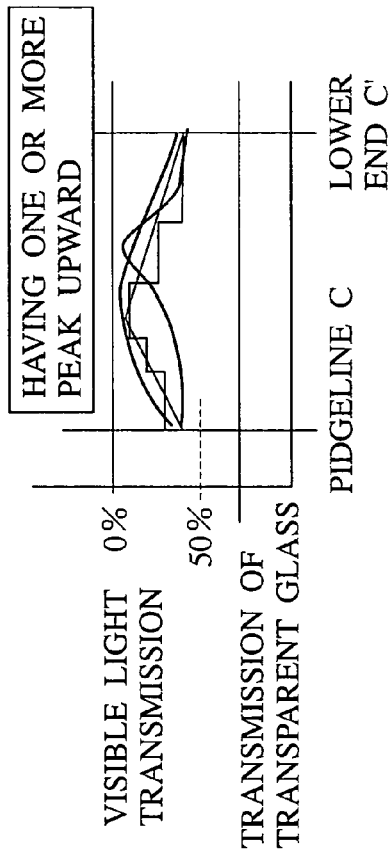
FIGS. 14A and 14B show a configuration of the visibility adjusting section in the case that the visible light transmission has a distribution state having an upward peak (a maximum value) along the vertical direction to the right and left ridgelines, in the second embodiment of the invention.
Figure 14B:
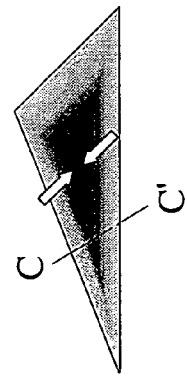

The visibility adjusting method according to the second embodiment is, as shown in FIG. 10, such that the visible light transmission of the area A in the lower side of the left and right ridgelines Rl and Rr is intermittently and continuously changed such as a top shade of the windshield used for reducing glare of the passenger. In this case, in general, the top shade is provided in the upper end of the windshield, and is configured such as to uniformly increase the visible light transmission toward the passenger, however, in the present invention, it is not necessary to set the direction of changing the visible light transmission as the top shade.

In this case, it is desirable that the visible light transmission of the area A is, as shown in FIG. 10, such that the visible light transmission in the lowermost end is highest. With the configuration mentioned above, since the driver can view the vehicle body via the visibility adjusting section 10, the driver does not feel insecure at the time when the vehicle runs at an extremely low speed range such as when backing the vehicle into a garage, the time of passing closely-by and the like. Further, in the vehicle in which the vehicle body is not visible, it is possible to provide the parting line 11 while securing the visibility near the vehicle.

Further, as shown in FIGS. 11 to 14, the configuration may be made such that the visible light transmission of the area A is changed along the vertical direction to the left and right ridgelines Rl and Rr. In this case, FIGS. 11 to 14 respectively show a configuration in which the visible light transmission of the area A becomes higher according to being apart from the left and right ridgelines Rl and Rr, a configuration in which the visible light transmission of the area A becomes lower according to being apart from the left and right ridgelines Rl and Rr, a configuration in which the visible light transmission of the area A has a distribution state having a downward peak (minimum value) along the vertical direction to the left and right ridgelines Rl and Rr, and a configuration in which the visible light transmission of the area A has a distribution state having an upward peak (maximum value) along the vertical direction to the left and right ridgelines Rl and Rr. In this case, it is desirable that the visible light transmission in the left and right ridgelines Rl and Rr is equal to or less than 50%.

Further, as shown in FIGS. 15 to 18, the configuration may be made such that the visible light transmission of the area A is changed along the up and down directions of the area A. In this case, FIGS. 15 to 18 respectively show a configuration in which the visible light transmission of the area A becomes higher toward the lower end from the upper end, a configuration in which the visible light transmission of the area A becomes lower toward the lower end from the upper end, a configuration in which the visible light transmission of the area A has a distribution state having a downward peak (minimum value) in the up and down directions, and a configuration in which the visible light transmission of the area A has a distribution state having an upward peak (maximum value) in the up and down directions. In this case, it is desirable that the visible light transmission in the upper end is equal to or less than 50%.

Further, as shown in FIGS. 19 to 22, the configuration may be made such that the visible light transmission of the area A is changed along the right and left directions of the area A. In this case, FIGS. 19 to 22 respectively show a configuration in which the visible light transmission of the area A becomes higher toward the right end from the left end, a configuration in which the visible light transmission of the area A becomes lower toward the right end from the left end, a configuration in which the visible light transmission of the area A has a distribution state having a downward peak (minimum value) in the right and left directions, and a configuration in which the visible light transmission of the area A has a distribution state having an upward peak (maximum value) in the right and left directions. In this case, it is desirable that the visible light transmission in the right and left ends is equal to or less than 50%.

Figure 23A:
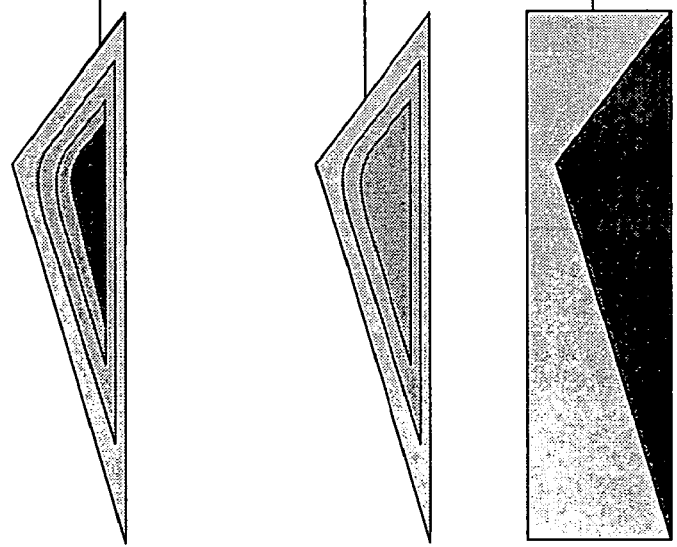
FIGS. 23A and 23B show a configuration of the visibility adjusting section in the case that the parting line is formed by an iso-transmission curve, in the second embodiment of the invention.
Figure 23B:
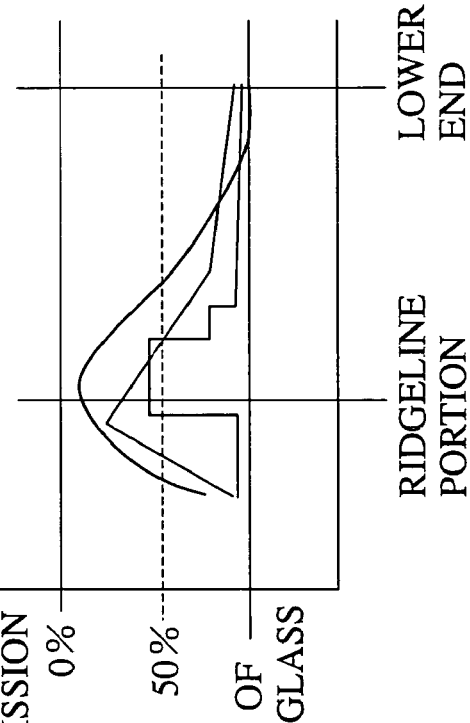

In this case, even when the visible light transmission of the end portion in the area A is equal to or more than 50%, it is possible to change the visible light transmission of the area A step by step, and it is possible to form the parting line 11 by an iso-transmission curve showing an area having the same visible light transmission, as shown in FIG. 23. According to the configuration mentioned above, it is possible to reduce the visible light transmission in comparison with a transparent portion (area B) of the windshield 1, in a wider range than the area A.

As is apparent from the description mentioned above, according to the visibility adjusting method of the second embodiment, since the visible light transmission of the visibility adjusting section 10 is intermittently or continuously changed, it is possible to partly control the visibility of the driver and the passenger on the assistant driver's seat, and it is possible to reduce a blind spot such as a front fender portion and the like.

Further, according to the visibility adjusting method of the second embodiment, since the visible light transmission of the area A is intermittently or continuously changed such that the left and right ridgelines Rl and Rr are clearly shown, it is possible to change the visible light transmission without losing the visibility adjusting effect, and it is possible to change the design property of the vehicle.

Further, according to the visibility adjusting method of the second embodiment, since the visible light transmission of the area A is set such that the visible light transmission in the lowermost end becomes highest, and the driver can view the vehicle body via the visibility adjusting section 10, the driver does not feel insecure at the time when the vehicle runs at an extremely low speed range such as when backing the vehicle into a garage, the time of passing closely-by and the like. Further, in the vehicle in which the vehicle body is not visible, it is possible to provide the parting line 11 while securing the visibility near the vehicle.

Third Embodiment

Next, a visibility adjusting method of a vehicle according to a third embodiment of the invention will be explained.

Figure 24:
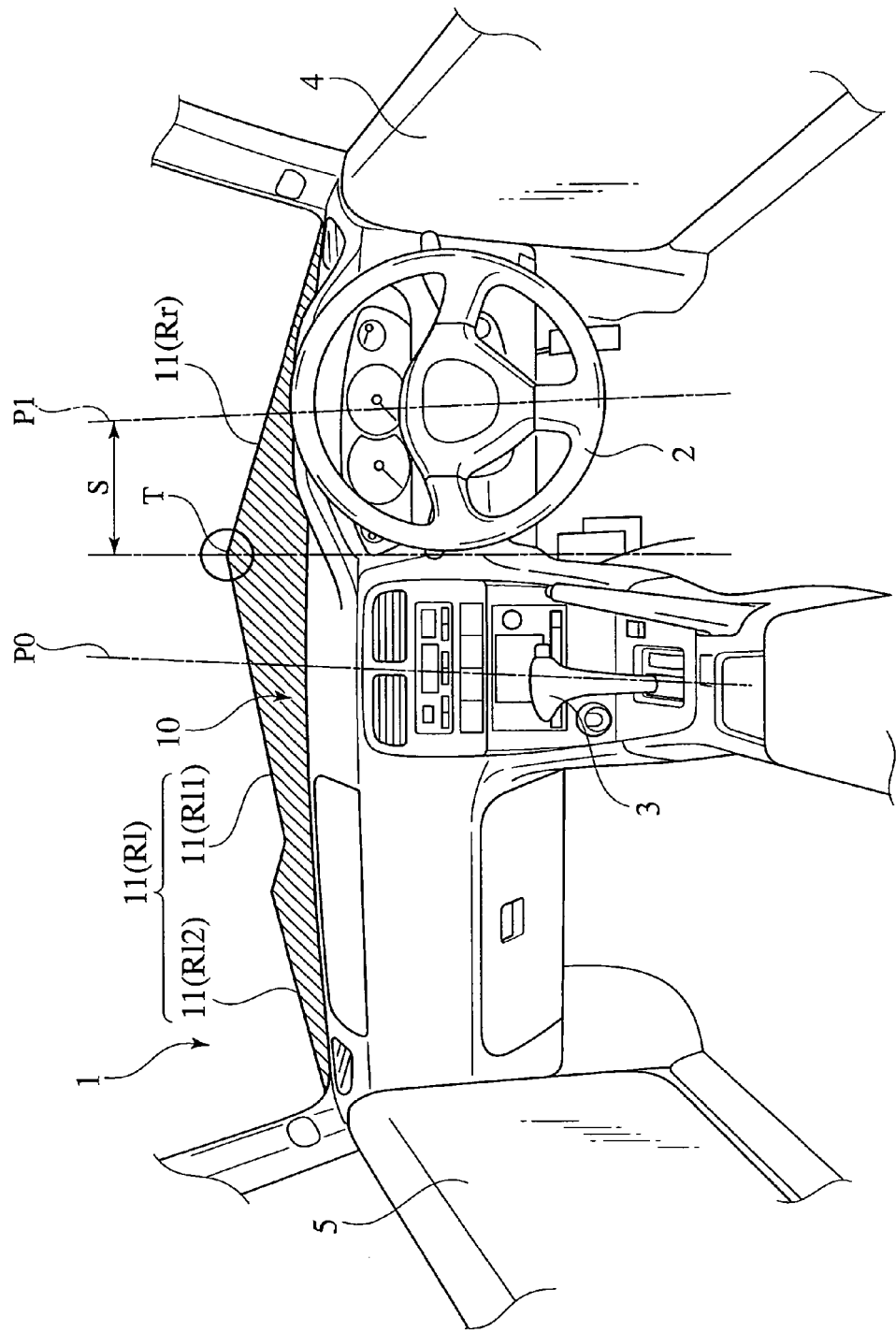
FIG. 24 is an explanatory view of a visibility adjusting method of a vehicle according to a third embodiment of the invention.

The visibility adjusting method of a vehicle according to the third embodiment is, as shown in FIG. 24, such that the left ridgeline Rl is divided into two ridgelines including a first ridgeline Rl1 and a second ridgeline Rl2, and the first ridgeline Rl1 and the second ridgeline Rl2 are arranged approximately parallel to each other and in different levels, in the visibility adjusting method of a vehicle according to the first embodiment. In this case, in FIG. 24, reference numerals 2, 3, 4 and 5 respectively denote a steering wheel, a control lever, a right front door and a left front door.

As mentioned above, in the visibility adjusting method of a vehicle according to the third embodiment, since the left ridgeline Rl is divided into two ridgelines including the first ridgeline Rl1 and the second ridgeline Rl2, and an area of the visibility adjusting section 10 can be made smaller in comparison with the case that the apex T and the end point of the visibility adjusting section 10 are connected by a simple line, it is possible to keep well the forward visibility at the time when the vehicle runs at a medium and low speed.

Further, in the visibility adjusting method according to the third embodiment, since the first ridgeline Rl1 and the second ridgeline Rl2 forming the left ridgeline Rl are configured such as to be approximately parallel to each other and be arranged in the different levels, it is possible to always keep constant the driver's attitude stabilizing effect regardless of the direction of the line of vision of the driver.

Figure 25A:
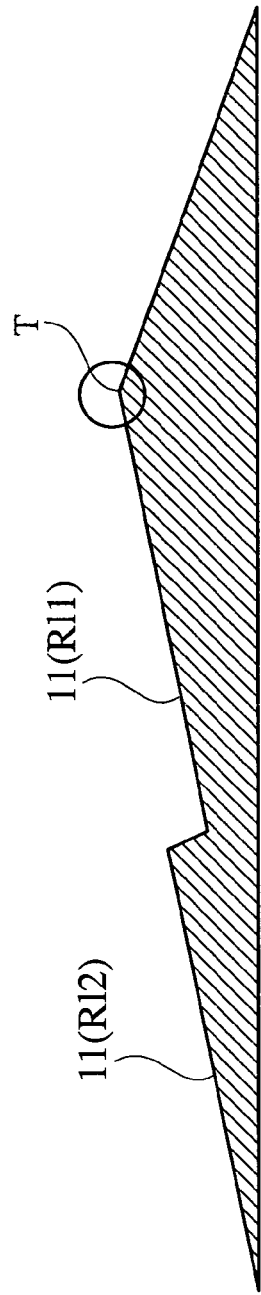
FIGS. 25A, 25B and 25C are views for explaining examples to which the visibility adjusting method of a vehicle according to the third embodiment of the invention is applied.
Figure 25B:
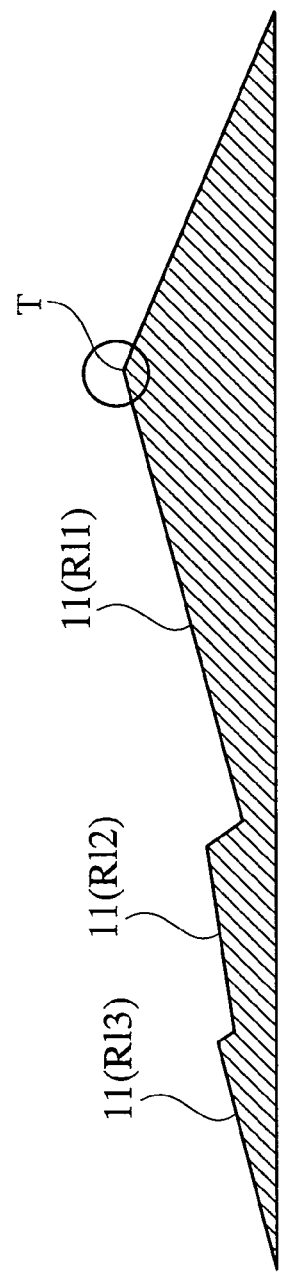
Figure 25C:
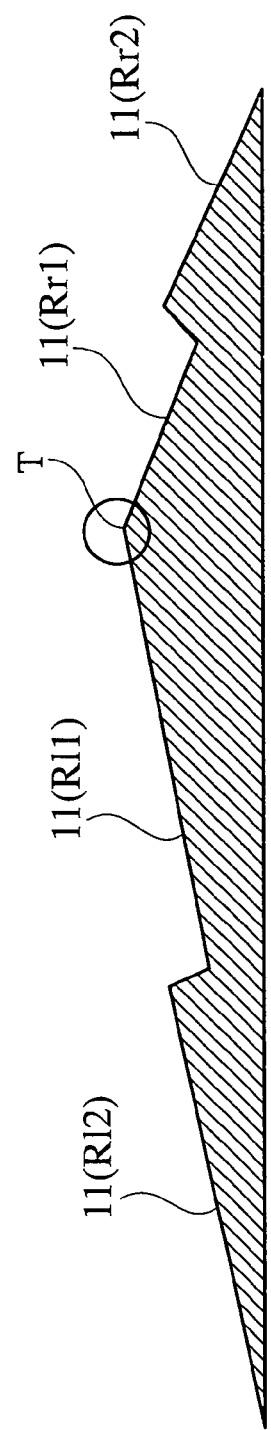

In the first embodiment, the left ridgeline Rl is divided into two ridgelines as shown in FIG. 25A, however, the present invention is not limited to this configuration, for example, the left ridgeline Rl may be divided into three or more ridgelines (three in the case shown in FIG. 25B), as shown in FIG. 25B. Further, for example, as shown in FIG. 25C, the ridgeline Rr in the side of the assistant driver's seat may be divided into a plurality of ridgelines.

Fourth Embodiment

Finally, a visibility adjusting method of a vehicle according to a fourth embodiment of the invention will be explained.

Figure 26:
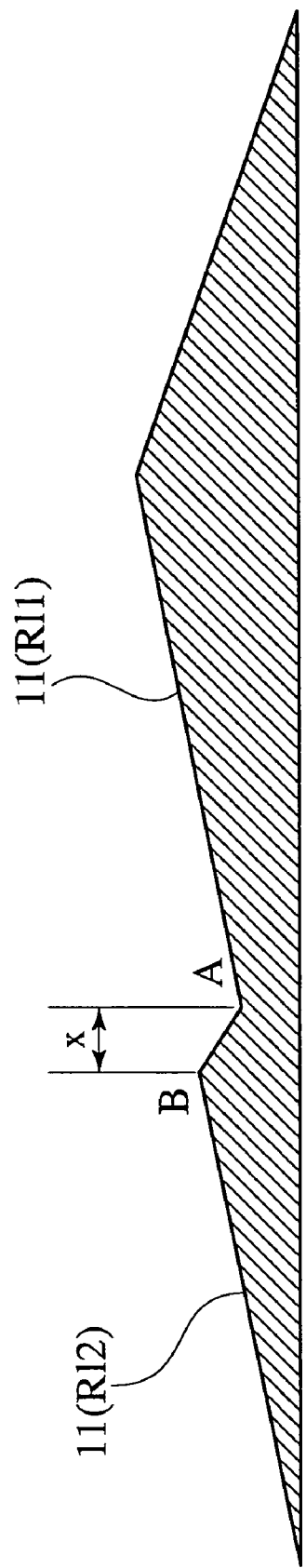
FIG. 26 is an explanatory view of a visibility adjusting method of a vehicle according to a fourth embodiment of the invention.

In the visibility adjusting method of a vehicle according to the fourth embodiment, as shown in FIG. 26, a shape in a section connecting between the first ridgeline Rl1 and the second ridgeline Rl2 is set at a obtuse angle by arranging the first ridgeline Rl1 and the second ridgeline Rl2 such that a vehicle outer side end point A of the first ridgeline Rl1 and a vehicle inner side end point B of the second ridgeline Rl2 are apart from each other at a distance x (x>0) in the vehicle-horizontal direction, and terminal ends of the first ridgeline Rl1 and the second ridgeline Rl2 are arranged at positions apart from each other in a vehicle-horizontal direction, in the visibility adjusting method of a vehicle according to the third embodiment.

As mentioned above, in the visibility adjusting method of a vehicle according to the fourth embodiment, since the shape in the section connecting the first ridgeline Rl1 and the second ridgeline Rl2 is set at the obtuse angle, the driver confuses the first ridgeline Rl1 and the second ridgeline Rl2 with one continuous ridgeline, so that even when the left ridgeline Rl is divided so as to be arranged in the different levels, the joint section of the divided ridgeline is hard to be recognized by the driver. In other words, according to the visibility adjusting method of a vehicle of the fourth embodiment, since the driver can dominantly recognize the ridgelines Rl and Rr which are downward inclined in the right and left directions from the apex T, it is possible to further secure the effect obtained by the driving posture stabilization. In this case, in this embodiment, the left ridgeline Rl is divided and the shape of the section connecting the divided ridgelines is set at the obtuse angle, however, the present invention is not limited to this, and the configuration may be made such that the right ridgeline Rr is divided and the shape of the section connecting the divided ridgelines is set at the obtuse angle.

Figure 27:
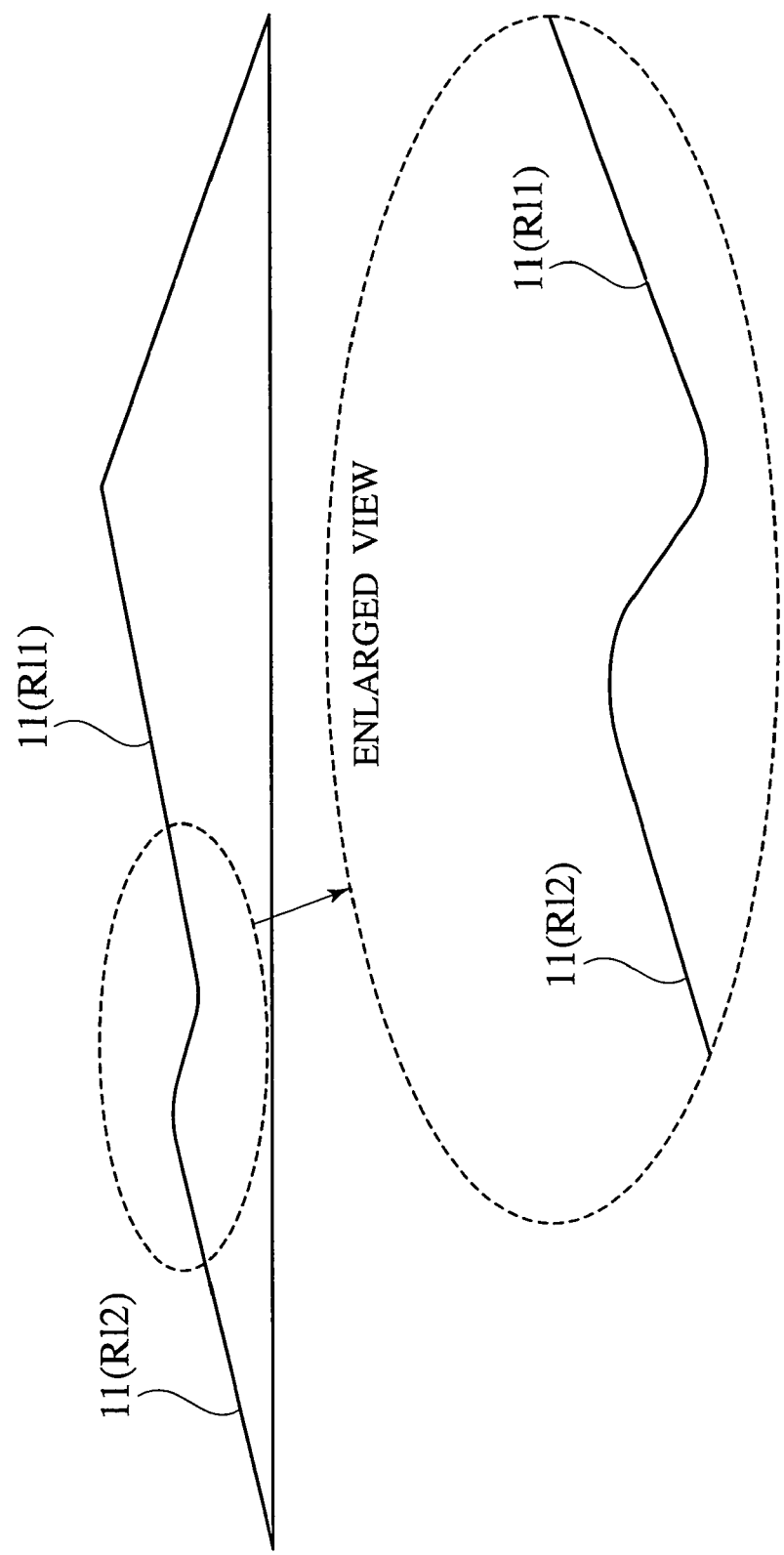
FIG. 27 is an explanatory view of an example to which the visibility adjusting method of a vehicle according to the fourth embodiment of the invention is applied.

In the fourth embodiment, the first ridgeline Rl1 and the second ridgeline Rl2 may be joined by a curve as shown in FIG. 27. With the configuration mentioned above, since the driver can more dominantly recognizes the ridgelines Rl and Rr which are downward inclined in the right and left directions from the apex T, it is possible to further secure the effect obtained by the driving posture stabilization than the configuration according to the fourth embodiment.

Figure 28:
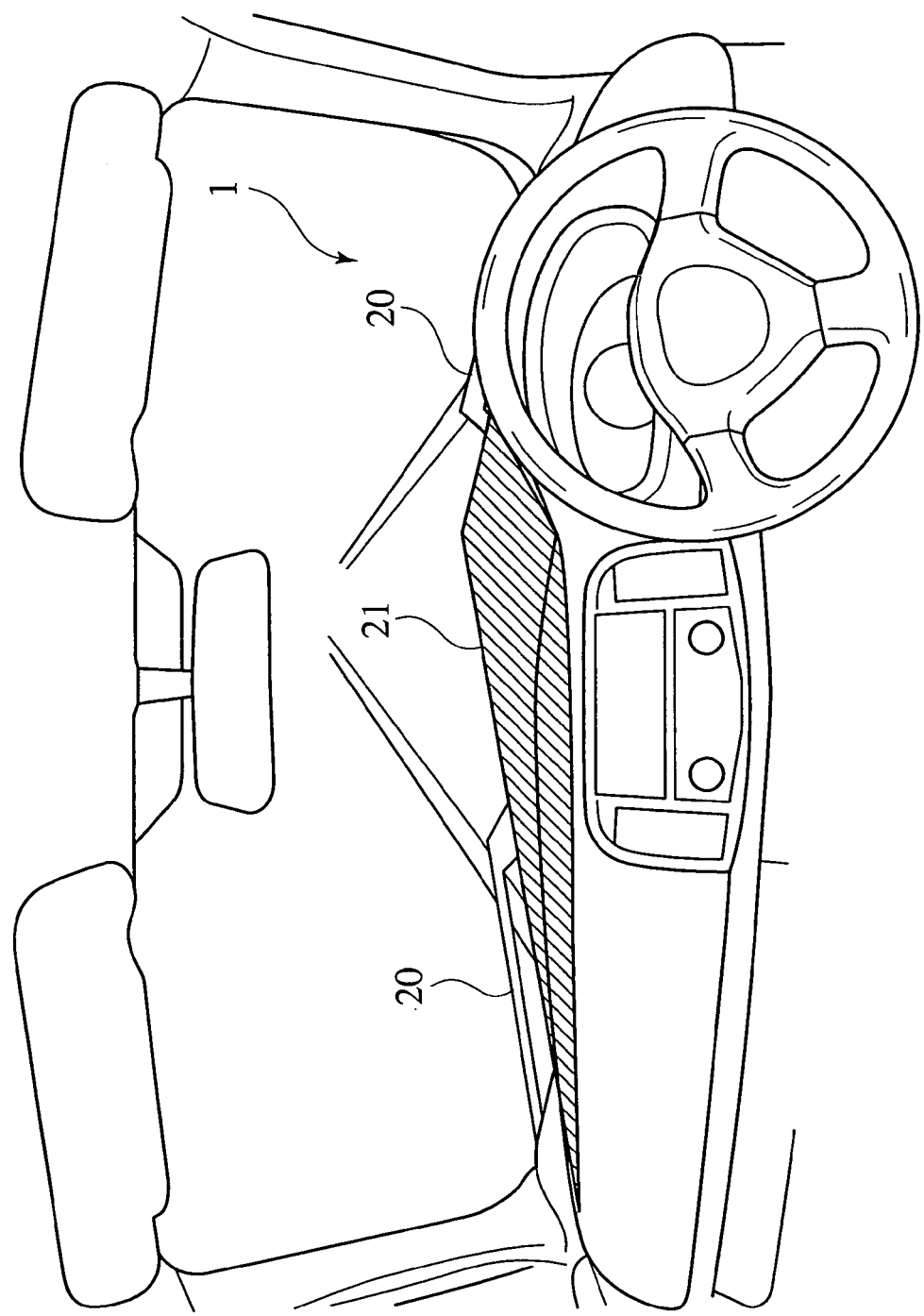
FIG. 28 shows a state in which a ridgeline is formed by upper surface shapes of a wiper arm and an instrument panel.

Further, in the third and fourth embodiments, as shown in FIG. 28, the ridgeline (the parting line 11) may be formed by a terminal line of a projection shape at the time of seeing the wiper arm 20 and an upper surface shape of the instrument panel 21 from a forward side of the vehicle. With the configuration mentioned above, since the ridgeline can be formed without applying any new parts, it is possible to inexpensively achieve the driving posture stabilizing effect of the driver. In this case, since the wiper arm 20 is generally positioned in opposite ends of the vehicle, the configuration mentioned above is very effective in the case that the second ridgeline Rl2 positioned in the outer side of the vehicle is formed by the wiper arm 20.

Figure 29:
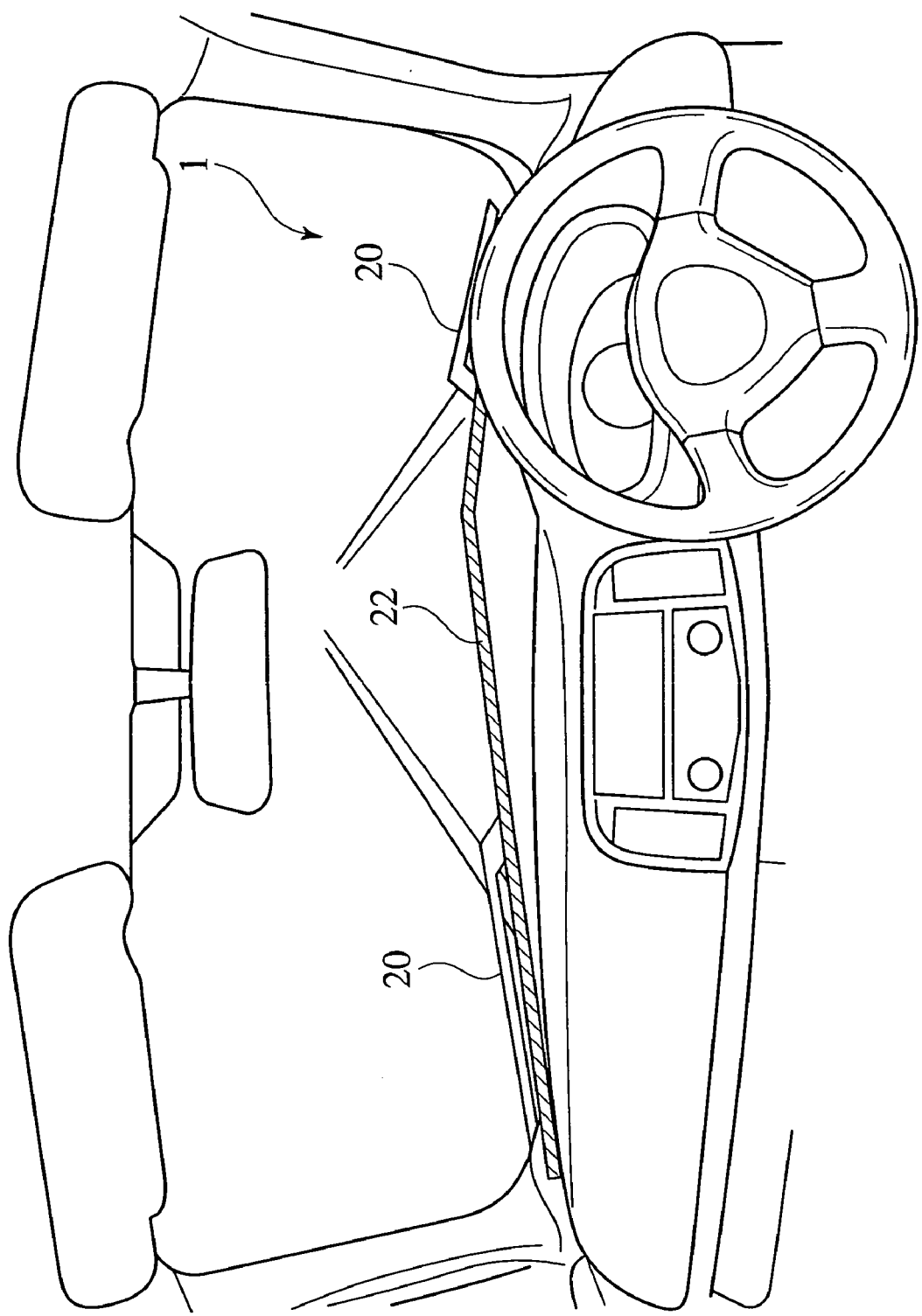
FIG. 29 shows a state in which the ridgeline is formed by the wiper arm and a plotting straight line (or curve) drawn on the windshield.

Further, in the third and fourth embodiments, as shown in FIG. 29, the ridgeline (the parting line 11) may be formed by a terminal line of a projection shape at the time of seeing the wiper arm 20 and a plotting straight line (or curve) 22 drawn on the windshield 1 from the forward side of the vehicle. With the configuration mentioned above, since the ridgeline can be formed without applying any new parts, it is possible to inexpensively achieve the driving posture stabilizing effect of the driver.

Figure 30:
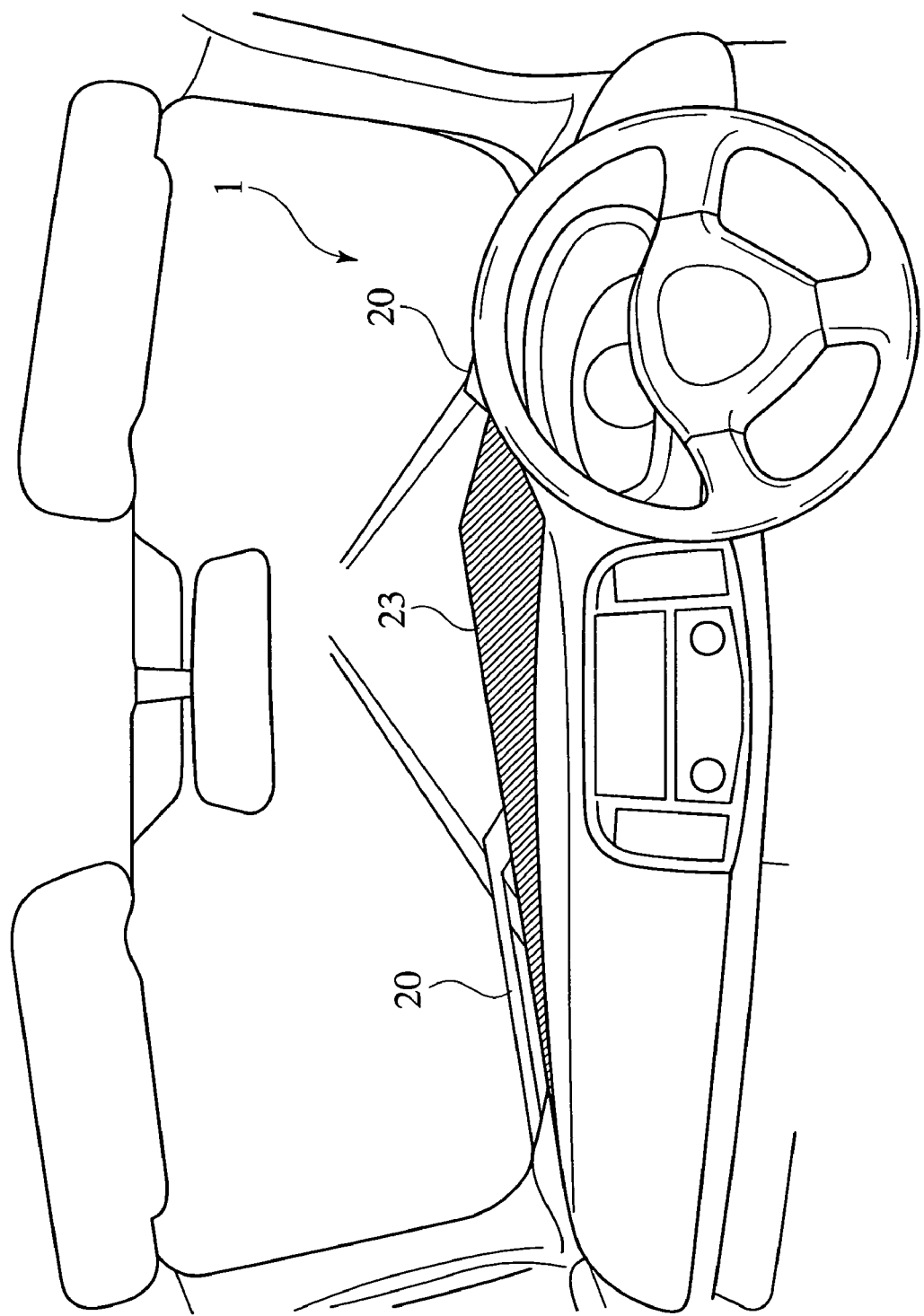
FIG. 30 shows a state in which the ridgeline is formed by the wiper arm and a terminal line formed by coloring or shielding lower ends of the windshield.

Further, in the third and fourth embodiments, as shown in FIG. 30, the ridgeline (the parting line 11) may be formed by a terminal line of a projection shape at the time of seeing the wiper arm 20 and a terminal line formed by coloring or shielding the lower end 23 of the windshield 1 from the forward side of the vehicle. With the configuration mentioned above, since the ridgeline can be formed without applying any new parts, it is possible to inexpensively achieve the driving posture stabilizing effect of the driver. Further, since the ridgeline can be formed regardless of the upper surface shape of the instrument panel, it is possible to improve a freedom in a vehicle design.

Figure 31:
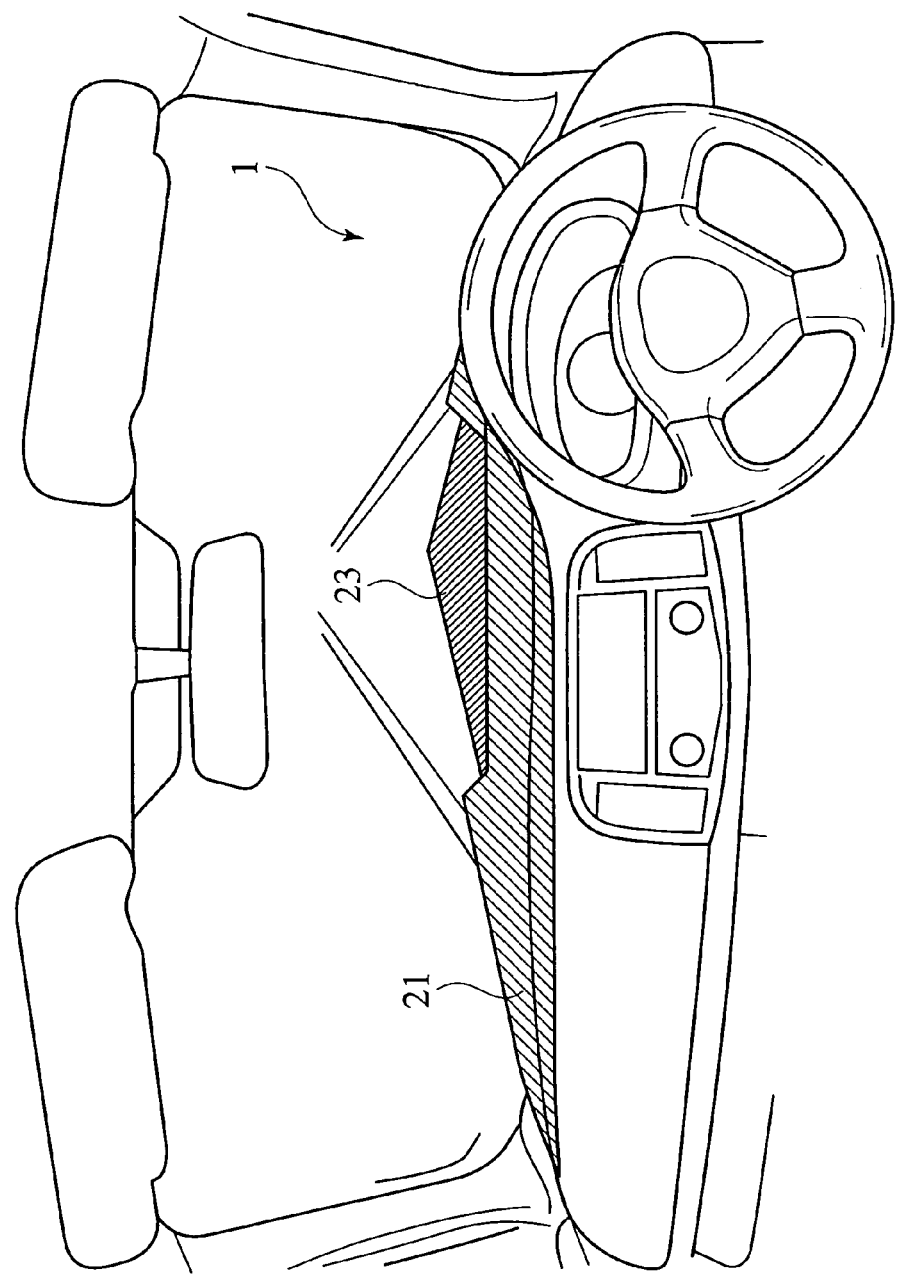
FIG. 31 shows a state in which the ridgeline is formed by an upper surface shape of the instrument panel and a terminal line formed by coloring or shielding the lower end of the windshield.

Further, in the third and fourth embodiments, as shown in FIG. 31, the ridgeline (the parting line 11) may be formed by a terminal line of a projection shape at the time of seeing the upper surface shape of the instrument panel 21 and a terminal line formed by coloring or shielding the lower end 23 of the windshield 1 from the forward side of the vehicle. With the configuration mentioned above, since the ridgeline can be formed without applying any new parts, it is possible to inexpensively achieve the driving posture stabilizing effect of the driver. Further, since a freedom in the upper surface shape of the instrument panel 21 is improved, it is possible to improve a design property of the vehicle and a freedom in a vehicle design.

Figure 32:
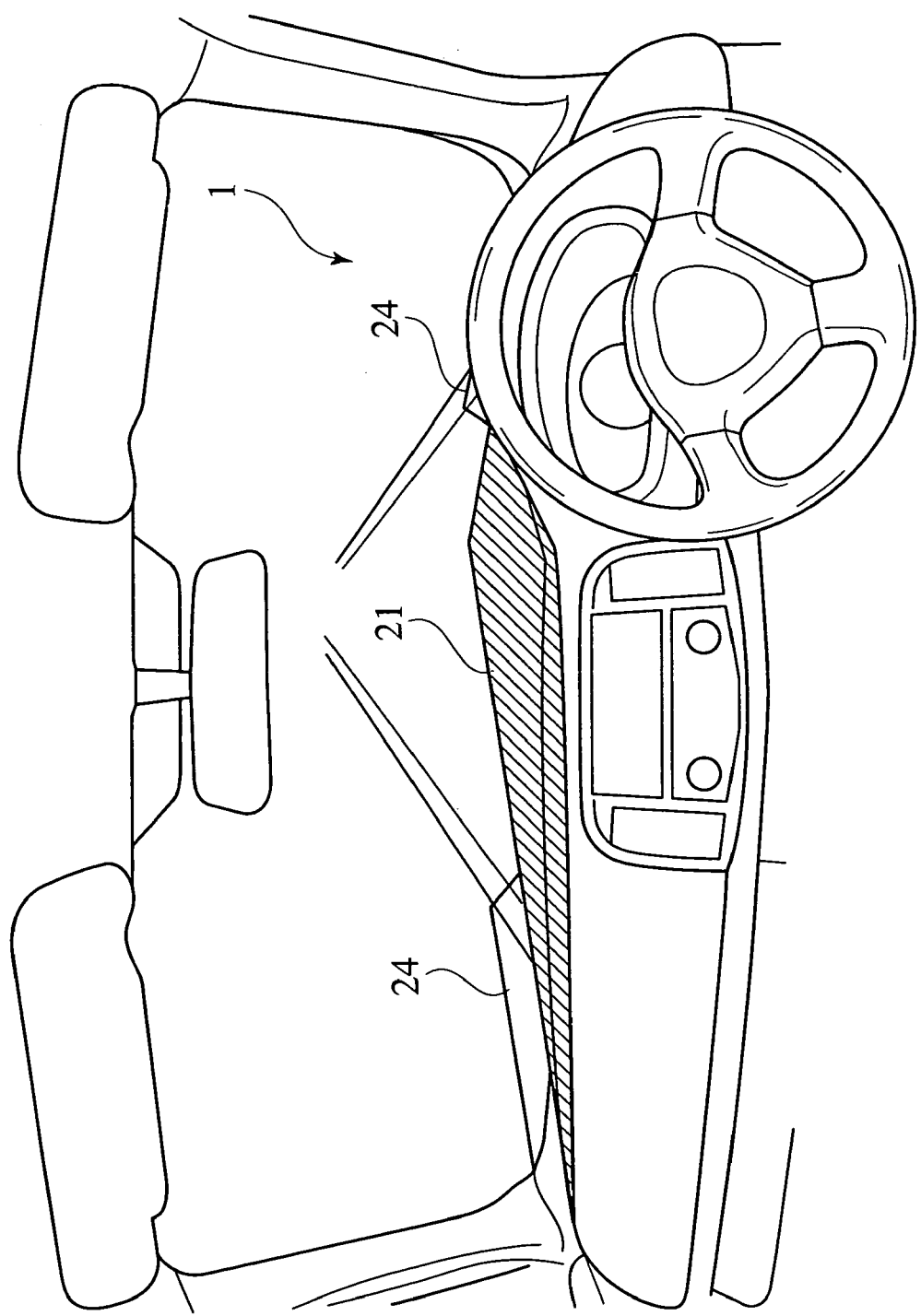
FIG. 32 shows a state in which the ridgeline is formed by the upper surface shape of the instrument panel and a plotting straight line (or curve) drawn on the windshield.

Further, in the third and fourth embodiments, as shown in FIG. 32, the ridgeline (the parting line 11) may be formed by a terminal line of a projection shape at the time of seeing the upper surface shape of the instrument panel 21 and a plotting straight line (or curve) 24 drawn on the windshield 1 from the forward side of the vehicle. With the configuration mentioned above, since the ridgeline can be formed without applying any new parts, it is possible to inexpensively achieve the driving posture stabilizing effect of the driver.

Figure 33:
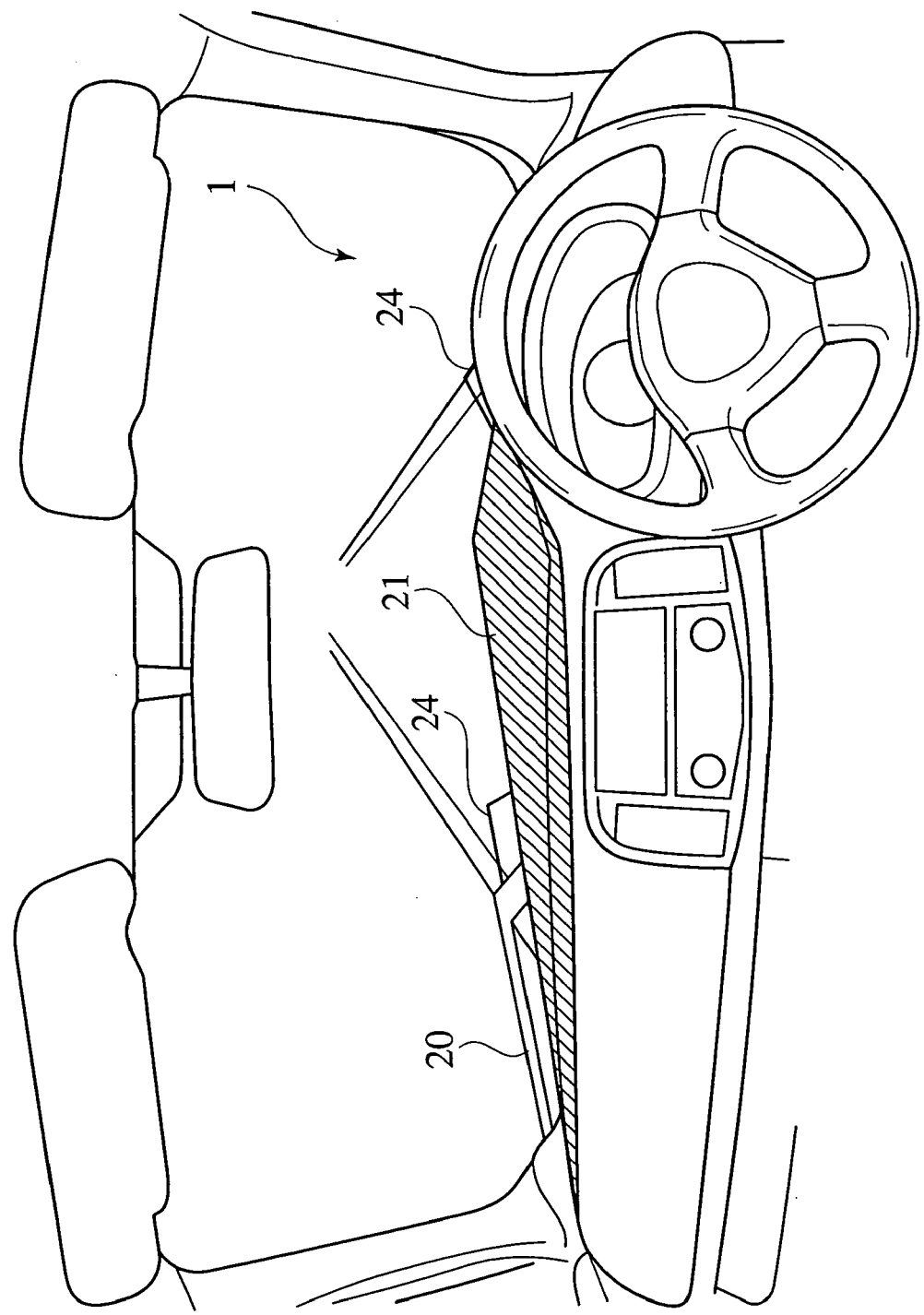
FIG. 33 shows a state in which the ridgeline is formed by the wiper arm, the upper surface shape of the instrument panel and the plotting straight line (or curve) drawn on the windshield.

Further, in the third and fourth embodiments, as shown in FIG. 33, the ridgeline (the parting line 11) may be formed by a terminal line of a projection shape at the time of seeing the wiper arm 20, the upper surface shape of the instrument panel 21 and the plotting straight line (or curve) 24 drawn on the windshield 1 from the forward side of the vehicle. With the configuration mentioned above, since the ridgeline can be formed without applying any new parts, it is possible to inexpensively achieve the driving posture stabilizing effect of the driver.

Figure 34:
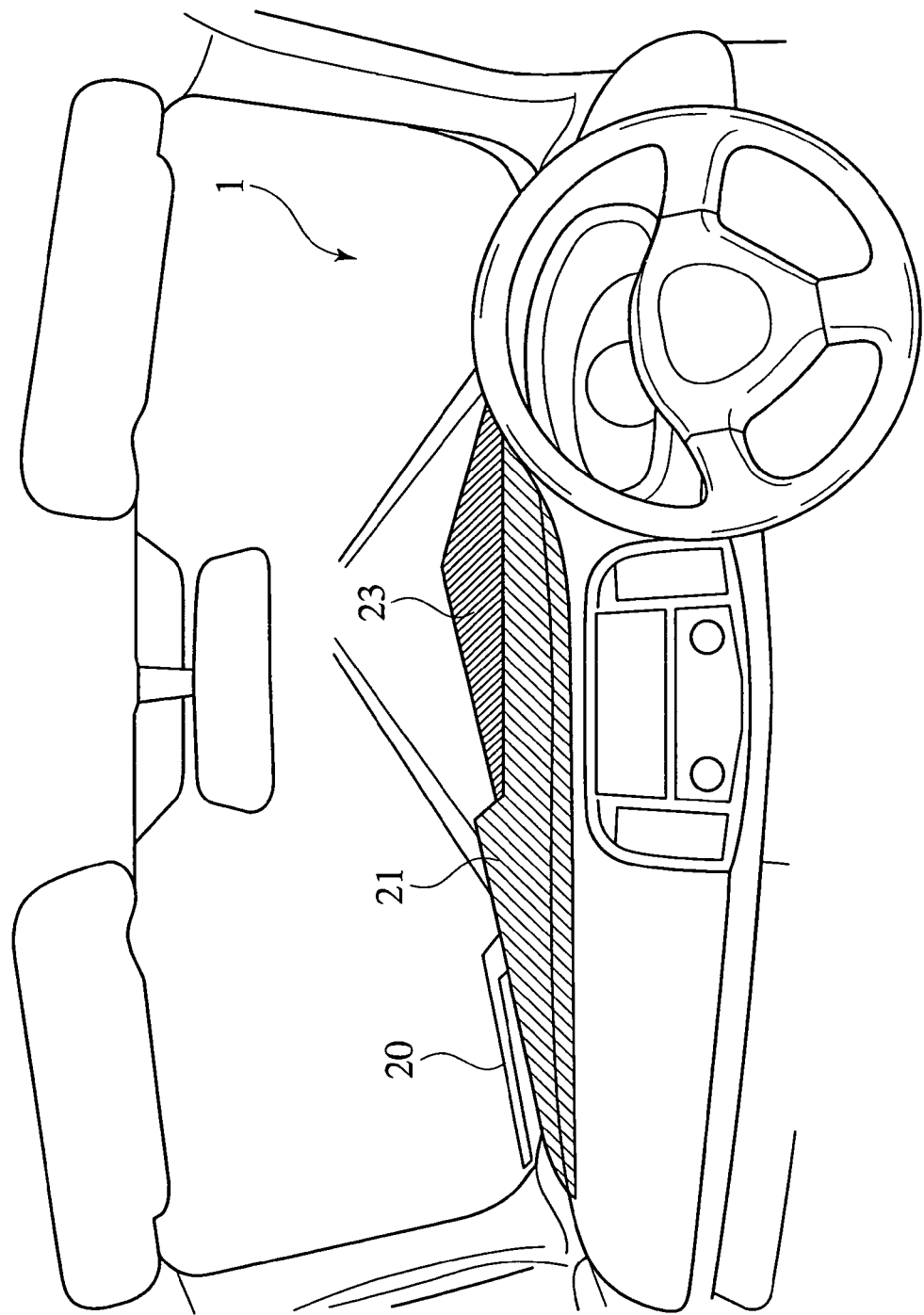
FIG. 34 shows a state in which the ridgeline is formed by the wiper arm, the upper surface shape of the instrument panel and the terminal line formed by coloring or shielding the lower end of the windshield.

Further, in the third and fourth embodiments, as shown in FIG. 34, the ridgeline (the parting line 11) may be formed by a terminal line of a projection shape at the time of seeing the wiper arm 20, the upper surface shape of the instrument panel 21 and a terminal line formed by coloring or shielding the lower end 23 of the windshield 1 from the forward side of the vehicle. With the configuration mentioned above, since the ridgeline can be formed without applying any new parts, it is possible to inexpensively achieve the driving posture stabilizing effect of the driver.

Although the visibility adjusting method of the vehicle of this invention has been described based on the first to fourth embodiments, the invention is not limited to these embodiments, and various changes and modifications may be made thereto without departing from the subject matter of the invention.

The entire content of a Patent Application No. TOKUGAN 2003-309273 with a filing date of Sep. 1, 2003, and a Patent Application No. TOKUGAN 2003-321597 with a filing date of Sep. 12, 2003, is hereby incorporated by reference.

What is claimed is:

1. A visibility adjusting method of a vehicle in which a windshield is provided at its lower end with a visibility adjusting section to adjust forward visibility of a driver, comprising the steps of:

disposing an apex at a position deviated from the driver and between a position opposed to the driver and a vehicle center position;

setting right and left ridgelines which uniformly downwardly incline from the apex toward opposite sides in a vehicle-width direction; and forming the visibility adjusting section by making a visible light transmission in a lower region of the right and left ridgelines lower than a visible light transmission in an upper region.

2. The visibility adjusting method according to claim 1, wherein the visible light transmission in the lower region is intermittently or continuously changed within the region.

3. The visibility adjusting method according to claim 1, wherein the lower region does not transmit any light from an outer side of the vehicle.

4. The visibility adjusting method according to claim 1, wherein the visible light transmission in the lower region is changed in correspondence to an intensity of the light.

5. The visibility adjusting method according to claim 1, wherein the lower region has a lowermost end and an uppermost end and wherein the visible light transmission in the lower region is intermittently or continuously changed such that the visible light transmission within the lower region is highest at the lowermost end of the lower region.

6. The visibility adjusting method according to claim 1, wherein the visible light transmission in the lower region is intermittently or continuously changed along a vertical direction to the right and left ridgelines.

7. The visibility adjusting method according to claim 1, wherein the visible light transmission in the lower region is intermittently or continuously changed along right and left directions of the lower region.

8. The visibility adjusting method according to claim 1, wherein the visible light transmission in the lower region is intermittently or continuously changed along up and down directions of the lower region.

* * * * *